United States Patent [19]
Hammerstrom et al.

[11] Patent Number: 5,487,153
[45] Date of Patent: Jan. 23, 1996

[54] NEURAL NETWORK SEQUENCER AND INTERFACE APPARATUS

[75] Inventors: Daniel W. Hammerstrom, Aloha; Dean W. Mueller; Stephen G. Owens, both of Portland, all of Oreg.

[73] Assignee: Adaptive Solutions, Inc., Beaverton, Oreg.

[21] Appl. No.: 267,005

[22] Filed: Jun. 24, 1994

Related U.S. Application Data

[63] Continuation of Ser. No. 752,769, Aug. 30, 1991, abandoned.

[51] Int. Cl.$^6$ .................................................. G06F 13/00
[52] U.S. Cl. .................... 395/250; 364/DIG. 1; 364/DIG. 2; 364/231.9; 364/239; 364/239.1
[58] Field of Search ............. 364/DIG. 1 MS File, 364/DIG. 2 MS File; 395/1, 2.11, 200.1, 200.7, 200.8, 200.13, 200.19, 250

[56] References Cited

U.S. PATENT DOCUMENTS

| | | | |
|---|---|---|---|
| 4,495,569 | 1/1985 | Kagawa | 395/725 |
| 4,574,348 | 3/1986 | Scallon | 395/775 |
| 4,737,932 | 4/1988 | Baba | 395/325 |
| 4,939,642 | 7/1990 | Blank | 395/800 |
| 4,992,933 | 2/1991 | Taylor | 395/375 |
| 5,036,453 | 7/1991 | Renner et al. | 395/800 |
| 5,175,865 | 12/1992 | Hillis | 395/800 |

*Primary Examiner*—Robert B. Harrell
*Attorney, Agent, or Firm*—Kolisch Hartwell Dickinson McCormack & Heuser

[57] ABSTRACT

The sequencer (14) is part of a computational system (10) which includes a computational circuit component, or processor node array (16); the sequencer, or controller component (14); and a boundary interface (34) between the computational circuit component (16) and the controller component (14). The controller component (14) provides three main functions in the system: (one) it sequences computations in a computational component (16), which includes an array of processor nodes (74, 76, 78, 80, 82, 84); (two) it provides I/O processing (20) from several disparate sources between the processor node array (16) and a host processor (12); and (three) it synchronizes data flow from a substantially asynchronous portion of the system (12) with a substantially synchronous data flow in the processor node array portion of the system (16).

35 Claims, 13 Drawing Sheets

NEURAL NETWORK SEQUENCER AND INTERFACE APPARATUS

This is a continuation of application Ser. No. 07/752,769 filed on Aug. 30, 1991 now abandoned.

BACKGROUND OF THE INVENTION

The invention relates to a sequencer and interface for a neural network, and specifically to a sequencer and interface which is operable to effect the transfer of data and control instructions to an array of processor nodes in a single-instruction stream/multiple-data stream processor.

Some form of sequencer is present in every computer system. However, in parallel systems, and particularly in neural network single-instruction stream/multiple-data stream (SIMD) systems, known to those skilled in the art, the sequencer is operable to control the input of commands to the processing portion of the computer only. In those instances where a sequencer does transmit both instructions and data, the instructions and data are not capable of simultaneous transmission to the processor portion of the computer. Additionally, known parallel processing sequencers provide only uni-directional parallel data communications between a processor portion of a computer and the sequencer and do nothing to synchronize the external and internal data flow to/from the processor.

A limitation of known sequencers is that a data stream must be manipulated as a whole. This can be particularly time consuming in the event that a particular portion of the data stream is required for manipulation by the processor portion of the computer.

An object of the invention is to provide a sequencer which is capable of providing control instructions and bi-directional parallel data communication between the sequencer and an array of processor nodes.

Another object of the invention is to provide a sequencer which provides for direct routing of processor array output back into the processor array for further processing.

A further object of the invention is to provide a sequencer which provides for direct routing of data to/from another sequencer.

Another object of the invention is to provide a sequencer which provides for direct routing of data from a processor array, through a sequencer, and to/from a data using/generating device.

Still another object of the invention is to provide a sequencer which synchronizes asynchronous, external data flow, to a synchronous, internal data flow in a neural network processor node array.

Yet another object of the invention is to provide a sequencer which provides multiple I/O virtual channels for data flow.

Another object of the invention is to provide a pointer manipulation mechanism in a SIMD neural network architecture.

A further object of the invention is to provide a sequencer which has the ability to manipulate a data stream to direct a particular point of the data steam to the processor array for processing.

Yet another object of the invention is to provide a sequencer which provides computation of an address in a control processor to transfer data from the control processor to a processor node.

SUMMARY OF THE INVENTION

The sequencer of the invention is used as part of a computational system which includes a computational circuit component, or processor array; the sequencer, or controller component; and a boundary interface between the computational circuit component and the controller component. The controller component includes a transfer mechanism which is capable of effecting communications between the computational circuit component and the controller component across the interface with simultaneous transfer of controller instructions and bi-directional parallel data communications.

The sequencer provides three main functions in the system. First, it sequences computations in a computational component, which includes an array of processor nodes. Second, it provides I/O processing between the processor node array and a host processor. Third, it synchronizes data flow from a substantially asynchronous portion of the system with a substantially synchronous data flow in the processor node array portion of the system. The sequencer may be arranged with external devices, which may generate or use data, to receive and transmit data directly from or to such devices, with the data passing through the sequencer or going directly to the computational component under the control of the sequencer.

These and other objects and advantages of the invention will become more fully apparent as the explanation which follows is read in conjunction with the drawings.

BEST MODE OF PRACTICING THE INVENTION

In order to implement a neural network in a conventional digital computer, a number of interfaces must be provided in order to control I/O operations between the host computer and the neural network. One function of such an interface provides synchronization between the substantially asynchronous world of the host and the highly parallel, synchronous world of the neural network. Another function is to provide I/O control for data storage and retrieval, including selectively locating stored data and manipulation thereof. A third function is to provide the actual sequencing of commands to insure that appropriate commands act on specific data sets.

System Overview

Figure 1:
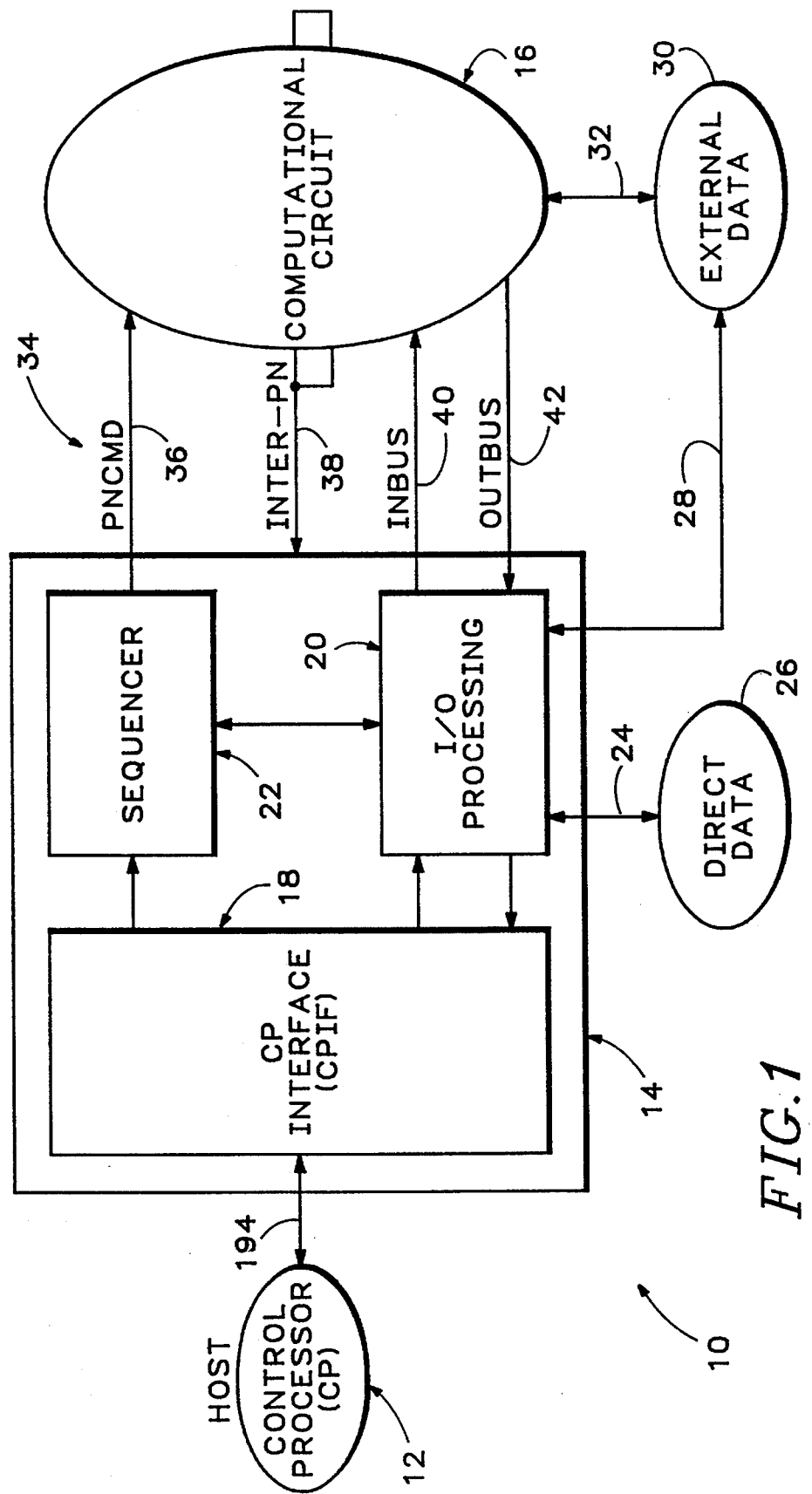
FIG. 1 is a block diagram of a computational system constructed according to invention.
Figure 2:
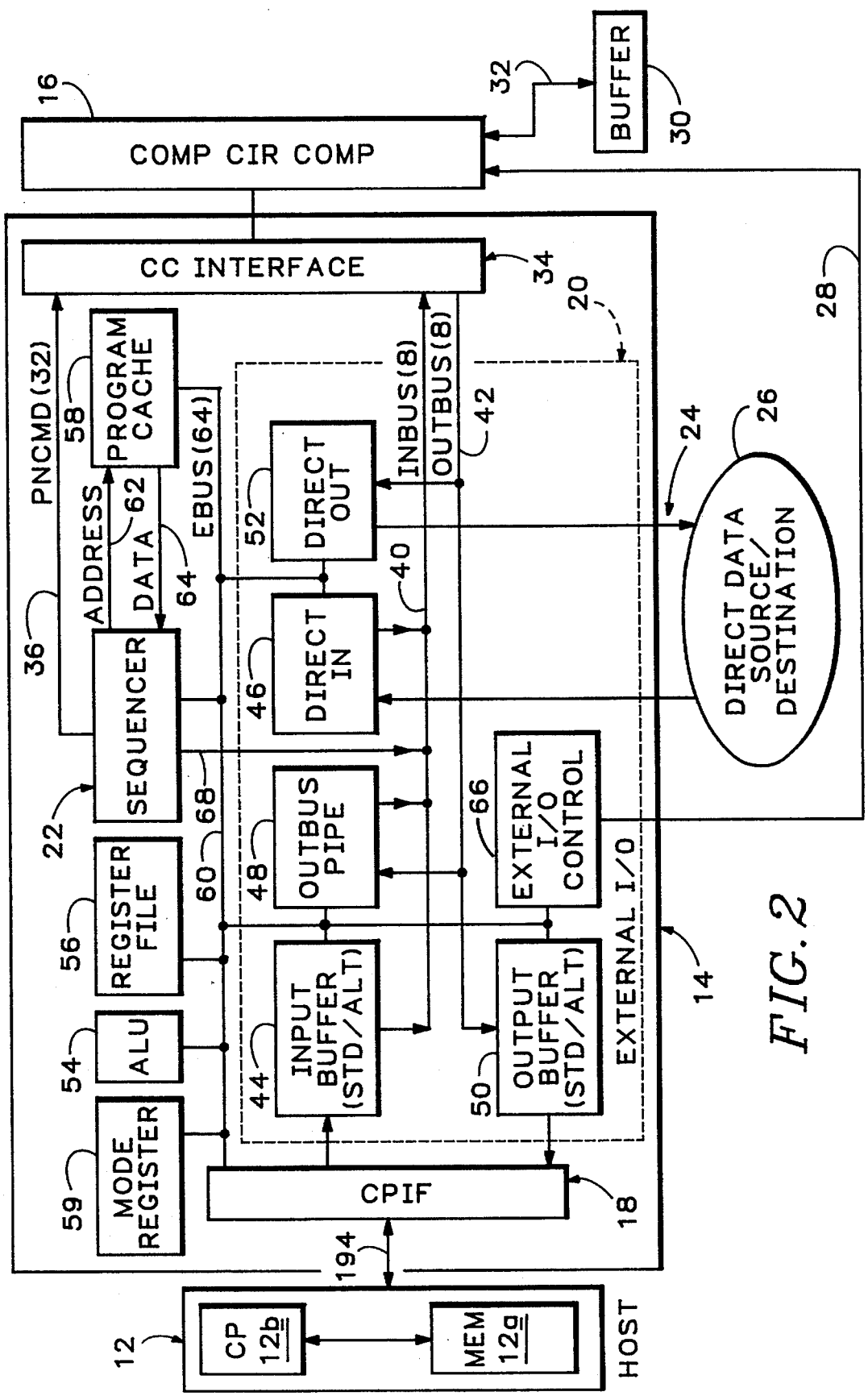
FIG. 2 is a block diagram of the controller component of the system of FIG. 1.

Turning initially to FIGS. 1 and 2, a computational system of the invention is depicted generally at 10. System 10 is connected to a host, or control processor 12. Control Processor (CP) 12 includes a CP memory 12a and a CP central processor 12b. Control processor 12 may be a personal computer, such as an IBM compatible PC, or a workstation, such as a SUN Microsystems, Inc. workstation. As used herein, CP memory 12a includes both RAM and fixed, or disc, memory in CP 12.

System 10 includes a control component 14 and a computational circuit component 16. Control component 14, in the preferred embodiment, takes the form of a CNAPS™ sequencer chip. (CNAPS™ is a trademark of Adaptive Systems, Inc.) CNAPS™ stands for Connected Network of Adaptive ProcessorS, which form computational circuit component 16. Control component 14, also referred to as a CNAPS™ Sequencer Chip, or CSC, functions as a sequencer and I/O controller for an array of processor nodes (PNs) in computational circuit component 16, also referred to herein as a PN array.

Computational system 10 may be assembled on a circuit board, which may be installed in host computer 12, or attached thereto as peripheral. Computational system 10 may be programmed to perform a variety of tasks, such as character or voice recognition, robotic control, or any other task which requires high speed, parallel, fast computation and analysis. Control component 14 provides the hardware resources required to utilize an array of computational components, which emulate neural networks, in a system application. The system architecture provides the bus interface and control functions that connect the computational components to an external host processor 12 and its memory 12a. Control component 14 acts as a sequencer-I/O controller and interface between host computer 12 and computational circuit component 16. As previously noted, CSC 14 provides three major functions: 1) a control processor interface, 2) programming sequencing, and 3) I/O processing.

Processing by computational circuit component 16 and control component 14 is initiated when host computer 12 directs instructions/data into control component 14. Such instructions/data may include, among other things, "pointers" to control component 14's internal memory and to the program to be executed, "pointers" to input and output vectors, and to program code. Once this is accomplished, an EXECUTE command is issued by CP 12 and control component 14 begins sequencing the program.

CSC 14 also includes a control processor interface (CPIF) 18, and I/O processing portion 20 and a sequencer portion 22. CSC 14 includes a direct data interface 24, for receiving and transmitting data directly to and from another entity, which is represented by block 26, such as an input or output device, or another CSC.

An external data interface 28, allows the transmission of external data, i.e., not from CP 12, a device connected to a CSC, or from a CSC, directly to/from computational circuit component 16, from an external data source/sink 30, which includes a buffer mechanism, over an external data bus 32.

A computational circuit, or boundary, interface 34 allows for the transfer of data and commands between CSC 14 and computational circuit component 16. Interface 34 includes a PNcmd bus 36, for transmitting instructions to PN array 16, an inter-PN bus 38, an INbus 40, an OUTbus 42, a jump test circuit (not shown), and a pause control which is capable of suspending the operation of the computational components. The operations and functions of these busses and circuits will be explained more fully later herein.

Referring now to FIG. 2, CSC 14 is shown in greater detail. Referring initially to I/O processing portion 20, the I/O processor works in conjunction with sequencer 22 to source or sink data with computational circuit component 16 using an output channel and an input channel. There are three primary sources of data for INbus 40 and three primary sinks for OUTbus 42.

The first source for INbus 40 is INPUT buffer 44, the second source is that coming from direct data source 26, which goes to a DIRECTIN buffer 46, which contains plural registers, and the last source is from OUTbus PIPE 48. Sinks for OUTbus 42 are OUTPUT buffers 50, direct data destination 26, through a DIRECTOUT register 52, and OUTbus PIPE 48.

I/O processing for INbus 40 and OUTbus 42 is designed to allow a variety of data flow paths to interact with, and be synchronized to, PN array 16. Each instruction contains fields which specify the I/O type for that specific instruction. OUTbus PIPE 48, which is also referred to herein as a data shunt path, is operable to route data from the output of PN array 16, which enters CSC 14 over OUTbus 42, directly back to PN array 16 over INbus 40. As used herein, output channel refers to OUTbus 42 and OUTPUT buffer 50, while input channel refers to INbus 40 and INPUT buffer 44. I/O buffers refer, collectively, to INPUT buffer 44 and OUTPUT buffer 50.

Data shunt path 48 becomes operational upon appropriate instructions from a sequencer 22, which enables OUTbus PIPE 48. Such instructions activate OUTbus PIPE 48, which causes data on OUTbus 42 to feed back to INbus 40. This data wrap allows recursive networks or multi-layer feed forwarding networks to be implemented efficiently in computational circuit component 16. In the case of a feed forward network, one layer of PN's in PN array 16 transmit output data while the next layer in the array computes the output. It should be appreciated that there are a number of control paths/lines which are not shown for the sake of clarity. The CSC has numerous individual control lines which connect the CSC components and which are under the control of sequencer 22. These lines allow sequencer 22 to issue commands which cause the transfer of data, manipulation of data, and which control operations on the data.

Additional components of CSC 14 include an arithmetic logic unit (ALU) 54, a register file 56, and a program cache 58, also denoted herein by the name PMEM, and a mode register 59. Mode register 59 is operable to enable INPUT buffer 44 and OUTPUT buffer 50, to enable interrupt CP 12 operations, to enable refresh of PN array 16, and to set Intel® Motorola® formats, among other functions. In the preferred embodiment, mode register 59 is a 6-bit register.

A command/data transfer bus, referred to herein as EBUS 60, provides transfers of instructions and data between the components of CSC 14. EBUS 60 is used for CP 12 access to internal state and for data transfer instructions for CSC-controlled access between various internal state. Transfers occur between CP memory 12a and internal state over EBUS 60 during a cache block fetch. The I/O processing blocks connect to both EBUS 60, for state access, as well as to INbus 40, OUTbus 42 and CPIF 18.

Two other busses are provided between sequencer 22 and a program cache 58. They are address bus 62 and data bus 64. External I/O control 66 is connected to EBUS 60 and controls external I/O operation to PN array 16.

As depicted in FIGS. 1 and 2, EBUS 60 provides a connection between the components of CSC 14. INbus 40 and OUTbus 42 are connected to the components of I/O processing portion 20. Sequencer 22 is connected to PNcmd bus 36 and a LOAD FIELD bus 68, which connects to INbus 40.

All of the signals which flow between host computer 12 and PN array 16 transit CSC 14 over the various bus structures, collectively referred to herein as bus structure means, which include CPIF 18 bus structures and interface 34 bus structures. It should be noted that EBUS 60 is a bi-directional bus and that the components of CSC 14 attached thereto may either receive and/or transmit instructions or data on EBUS 60.

Computational Circuit

Referring now to FIG. 3, with reference to FIGS. 1 and 2, the computational circuit component will be described in greater detail. FIG. 3 depicts a System 10 having two such computational circuits, although a single circuit or many circuits may be provided, depending on the purpose of the system. A first computational circuit, or $PN_1$ array, 16, and a second computational circuit, or $PN_2$ array, 70, with CSCs 14, 72, respectively, is depicted. CPIFs 18 and 73 are depicted as separate blocks to facilitate description of the bus structure between the CSC proper and the CPIF. It should be appreciated that, in the preferred embodiment, CPIFs 18, 73 are part of CSCs 14, 70, respectively. Each PN array includes one or more processor node (PN) arrays, such as those depicted at 74, 76 and 78 for $PN_1$ array 16, and 80, 82 and 84 for $PN_2$ array 70, which, in the preferred embodiment, are integrated circuits. The construction of a PN array is disclosed in U.S. Pat. No. 4,796,199, granted Jan. 3, 1989 to Hammerstrom et. al., for NEURAL-MODEL INFORMATION HANDLING COMPUTATIONAL ARCHITECTURE STRUCTURE. Additional features of the PN arrays are disclosed in U.S. Pat. No. 4,918,617, granted Apr. 17, 1990 for NEURAL-MODEL COMPUTATIONAL SYSTEM WITH MULTI-DIRECTIONAL OVERLAPPING BROADCAST REGIONS, and U.S. Pat. No. 4,983,962, granted Jan. 8, 1991 for NEURAL-MODEL COMPUTATIONAL ARCHITECTURE EMPLOYING BROADCAST HIERARCHY AND HYPERGRID POINT-TO-POINT COMMUNICATION.

To briefly describe a PN array, it is a cluster of processor nodes, which are connected in families to a computational center, which in turn is connected to other computational centers of other families. The PN array operates in a come-from broadcast hierarchy and is capable of performing high speed parallel processing of data in accordance with known SIMD techniques. Computational circuit component 16 may include one or more PN arrays. The PN arrays are connected to CSC 14 by a computational circuit interface 34, which includes INbus 40, OUTbus 42, PNcmd bus 36 and an inter-PN bus 38. Additional inputs are provided for jump testing, which is a form of conditional branching. Several tests are performed by a jump test circuit, such as a loop-count=0 test, an inter-PN bit test, and OUTbus LSB test and an OUTbus active test. Signals are generated by PN array 16 that may cause CSC 14 to perform conditional branching as part of the synchronization function between CSC 14 and PN array 16.

As used herein, "PN array" may refer to a computational circuit component, such as 16 or 70, or to an individual PN array integrated circuit, such as that depicted at 74, or to a non-integrated circuit array of neural network processor nodes. Reference numbers will be provided to assist the reader. A PN array processes inputs from, and provides outputs to, an entity outside thereof, which includes CSC 14, any other CSCs, such as 72, CP 12, and any peripheral devices which may be connected to system 10. PN array 16 operates in a synchronous manner, that is, performing identical operations on a variety of data, as is typical of SIMD systems. The data coming into CSC 14, or directly into PN array 16, is generally asynchronous, and must be synchronized by CSC 14 prior to introduction to PN array 16 if the operation of PN array 16 is to be maximized.

External data may be directly input to a PN array over an external data bus, which is indicated at reference numeral 32 in FIGS. 1 and 2. Data may also be input to the individual PN's over INbus 40. In order to select the source of input for an individual PN, a multiplexer, or switch is associated with each PN for input and output. The input multiplexers, or "muxes", are indicated at 74a, 76a, 78a, 80a, 82a and 84a. Output buffers, located between a PN array and OUTbus 42, are indicated at 74b, 76b, etc. External INbuses are indicated by 74c, 76c, etc. External I/O control 66, as previously noted, is connected to an external data interface, which takes the form of a control bus 28a, which includes a number of control lines, which runs to the input muxes, and an external output control bus 28b which runs to external OUTbuffers 74d, 76d, etc., and which, like control bus 28a, includes a number of control lines. When external I/O control 66 receives an appropriate command from sequencer 22 over a control line, a signal is transmitted to an appropriate mux to select the source of data for the PN's from either INbus 40 or all of the external INbuses. Likewise, an appropriate signal transmitted over external output control bus 28b determines whether data transmitted from an individual PN is latched into the external output circuitry. External INbuses/OUTbuses as depicted in FIG. 3 represent an expanded version of bus 32 and source/sink/buffer 30 as depicted in FIG. 2. Buffers 74b, 76b, . . . 84b are required because only one PN array can transmit on OUTbus 42 at a time, although more than one PN array may have data ready to transmit over OUTbus 42 at any given time.

External output control bus 28b carries a signal from external I/O control 66 which determines where the data contained in external OUTbuffer 74b, 76b, . . . 84b will be directed. The data may be directed over an external OUTbus 74e, 76e, . . . 84e, where it may be further directed to the external INbus of another PN array, or the data may be directed to other connections (not shown) which provide command/control of, for instance, robotic systems.

Figure 12:
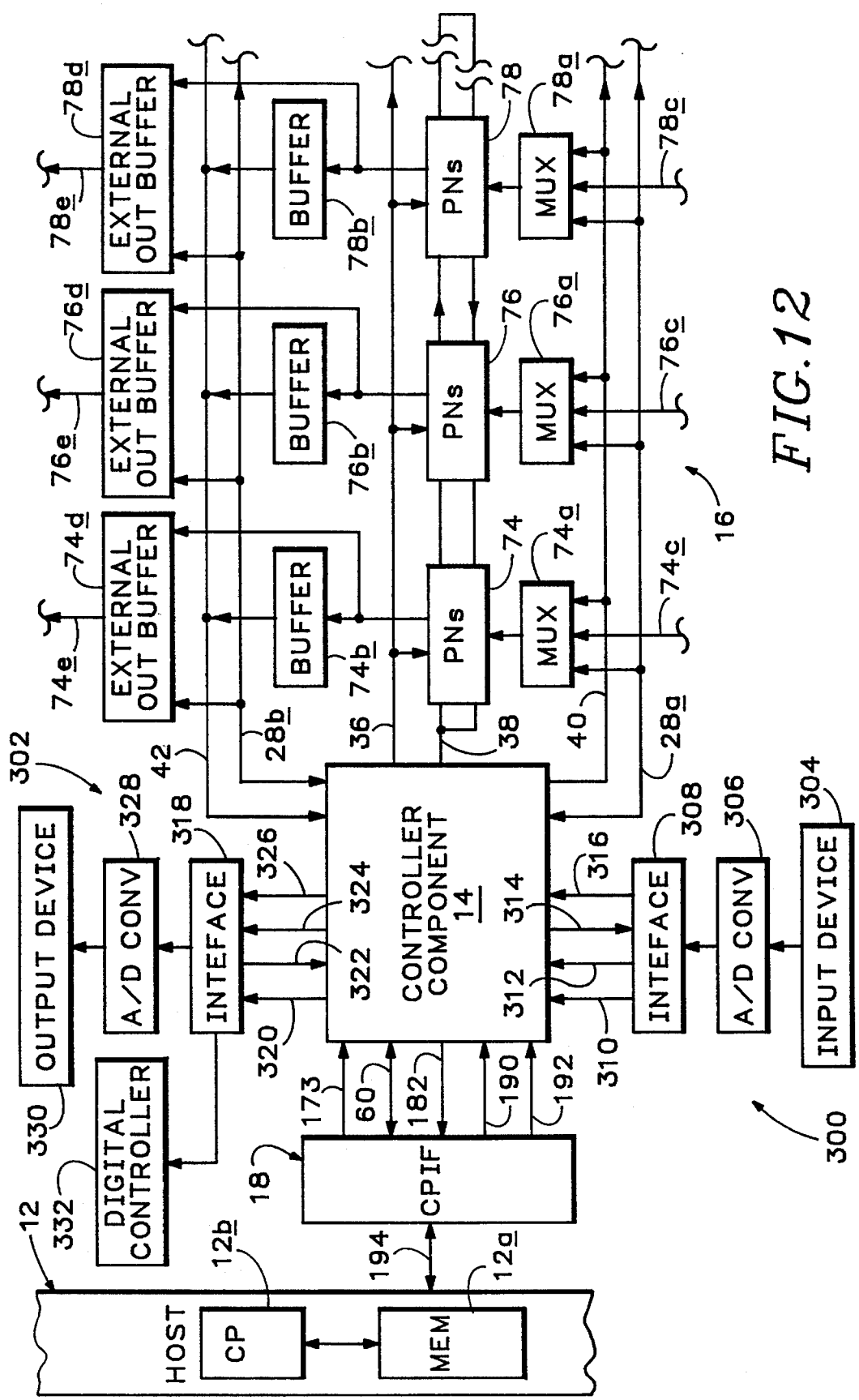
FIG. 12 is a detailed diagram of the computational system of FIG. 1, slightly modified to depict a single processor array and direct connection of a sequencer to a data using/generating device.

The transfer of data directly between two CSCs, or between a CSC and a data using/generating device, is accomplished over direct data interface 24. Referring initially to FIG. 12, the connection of direct input means 300 and direct output means 302 to CSC 14 is depicted. CSC 14 is connected to computation circuit 16, CPIF 18, and host control processor 12. This arrangement allows the connection of an input device 304, also referred to herein as a data-generating device, to CSC 14 without requiring that data from device 304 pass through host 12 and CPIF 18. Device 304 may be a scanning device, a robotic sensor, or any number of data-generating devices which provide information as to the state of the world outside of system 10. If device 304 is an analog device, the data from device 304 passes through an analog-to-digital converter 306 and then into an input interface 308. A/D converter 306 and input interface 308 comprise what is referred to herein as direct input interface means, although A/D converter 306 is not required if input device 304 generates a digital output.

Input interface 308 is connected to CSC 14 by a number of wires which provide a direct input connection means between the input interface and CSC 14. A data ready wire 310 is connected to a data ready register (not shown) which is contained in interface 308. A single bit instruction is placed in that register to indicate that data is ready, thereby asserting "data ready". A data "wire" 312, which, in the preferred embodiment, is an 8-bit bus, is connected between eight-bit registers (not shown) in CSC 14 and input interface 308, and is used to transfer data between the interface and the CSC. Once the appropriate data has been loaded into the data register, "data ready" is asserted. A data taken wire 314 is connected to a data taken register (not shown) in CSC 14. Once the CSC has captured the data, "data taken" is asserted by a one-bit signal which is transmitted over data taken wire 314. A "burst" wire 316, if active, allows data to be taken from the interface when available, in consecutive cycles.

CSC 14 may transmit data directly to a data-using device, such as output device 330 or digital controller 332 through an output interface 318 and, if necessary, a digital-to-analog converter 328. D/A converter 328 and output interface 318 comprise what is referred to herein as direct output interface means. Digital controller 332 may be a motor or robotic controller, or a speech synthesizer. Output interface 318 is connected to CSC 14 by direct output connection means, which include a data ready wire 320, a data taken wire 322, an 8-bit bus 324, and a "burst wire" 326, which function with associated registers in the same manner as has been described in connection with input interface 308.

Interfaces 308, 318 may be built on standard PLD or PAL structures. This type of structure allows synchronization of the CSC with outside components utilizing a maximum bandwidth. The need to transmit data through CP 12 bus structure is eliminated and a flexible direct interface with external hardware components is provided. This interface between CSC 14 and outside hardware provides a seamless integration of programs controls with the more traditional CP 12 memory stream I/O. This is particularly valuable in speech recognition and generation applications.

Figure 3A:
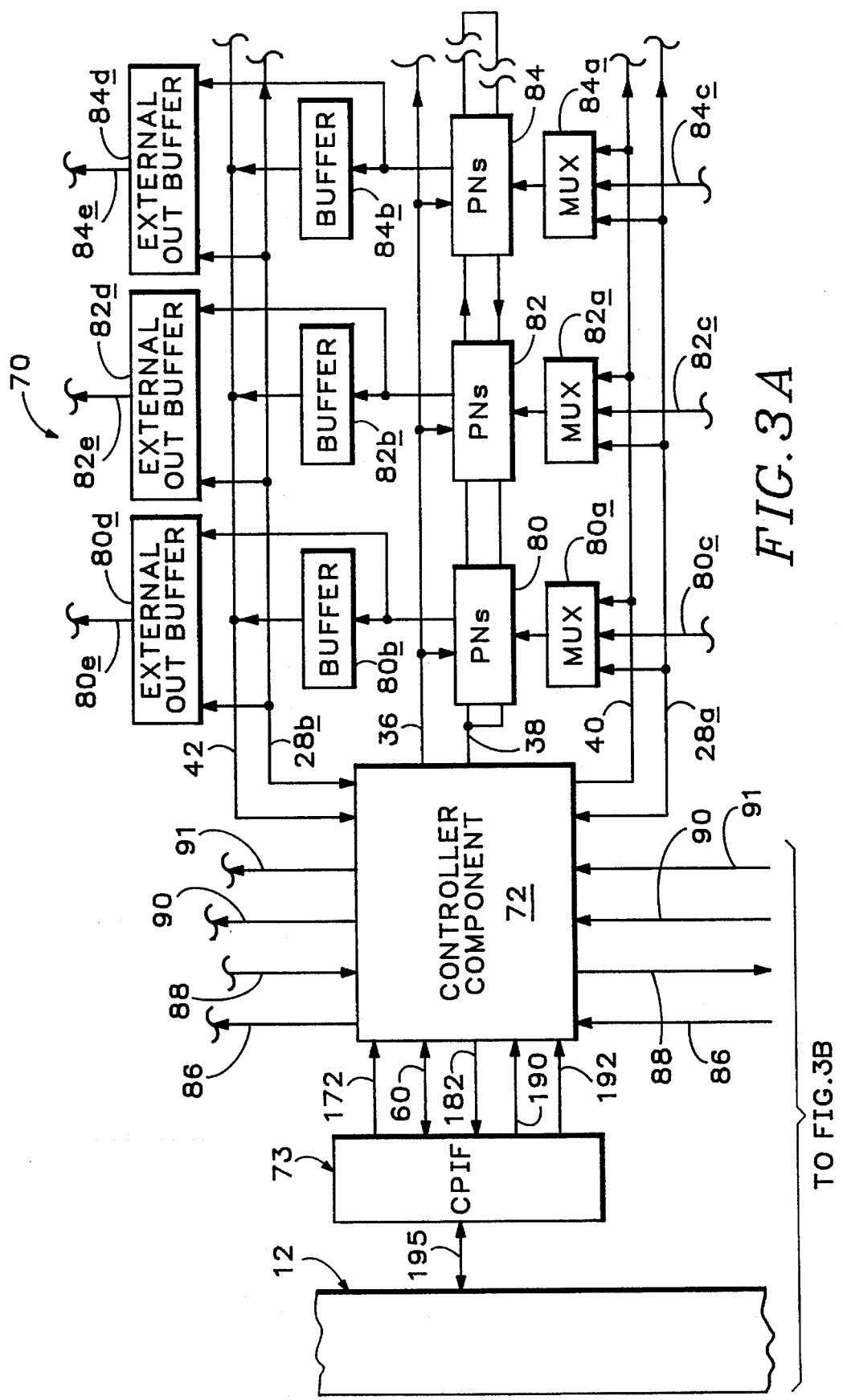
FIGS. 3A and 3B are slightly more detailed diagrams of the computational system of FIG. 1, showing parts of plural computational circuit components.
Figure 3B:
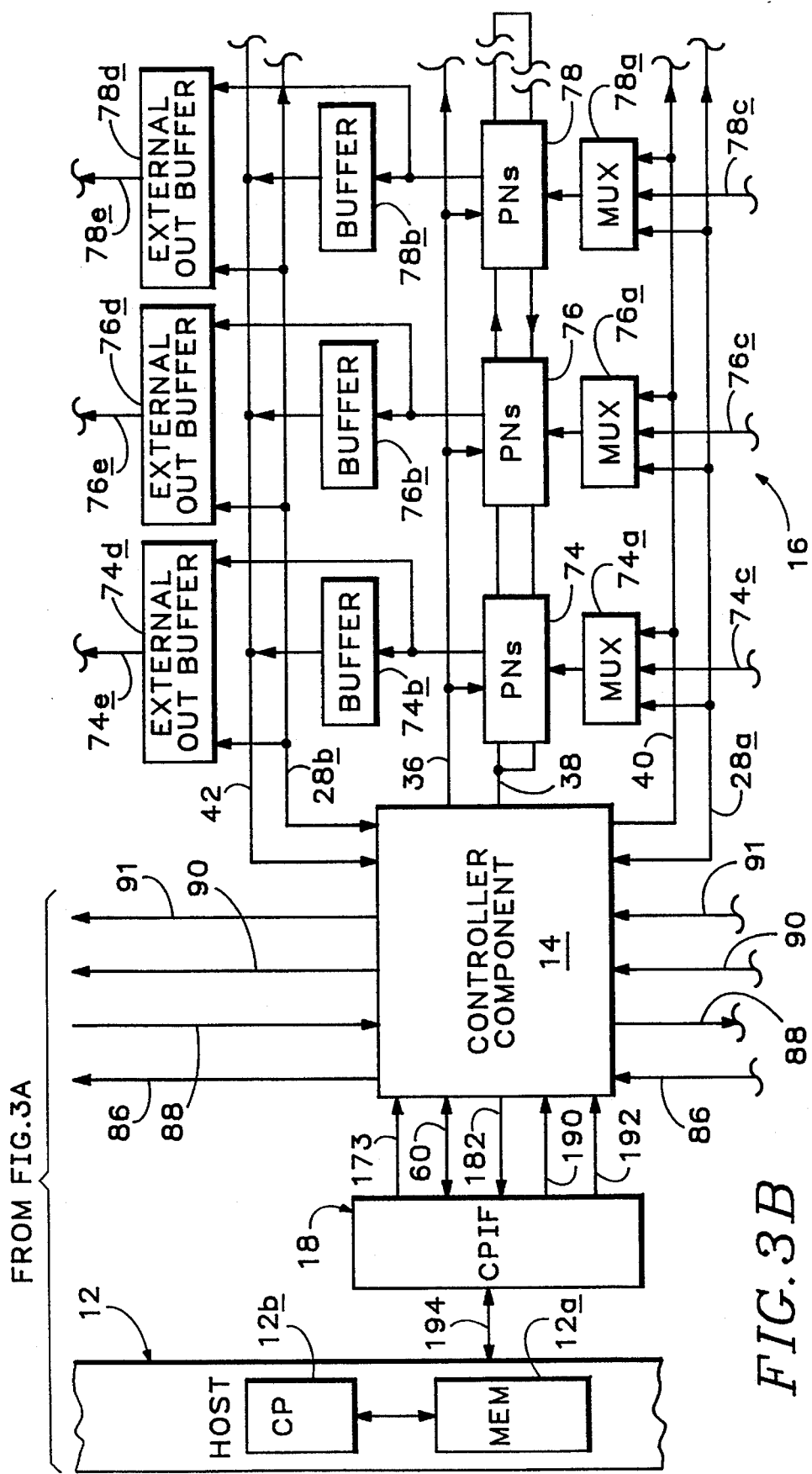

In another embodiment, and now referring to FIGS. 3A and 3B, direct data interface 24 includes four wires which link two CSCs. In this configuration, the second CSC may be thought of as the external data-generating/using device. A first, data ready wire 86 is connected to a data ready register (not shown) which is contained in, for instance, CSC 14. A single bit instruction is placed in that register to indicate that data is ready, thereby asserting "data ready". A second, data taken wire 88 is connected to a data taken register (not shown) in a second CSC, such as 72, and asserts "data taken" when the data is received by the second CSC. A data wire 90, which, in the preferred embodiment, is an 8-bit bus, is connected between eight-bit registers (not shown) in each CSC and is used to transfer data between CSCs. Once the appropriate data has been loaded into the data register, "data ready" is asserted. Once the second CSC has captured the data, "data taken" is asserted. A "burst" wire 91, if active, allows data to be taken from its source, when available, in consecutive cycles.

The components associated with the transfer of external data directly to and from a PN array are referred to collectively herein as first multiplexing means, or external data handling components. Those components associated with the transfer of data directly between an external source/destination and a CSC, or between two CSCs, are referred to collectively as second multiplexing means, or direct data handling components.

The Sequencer

Figure 4:
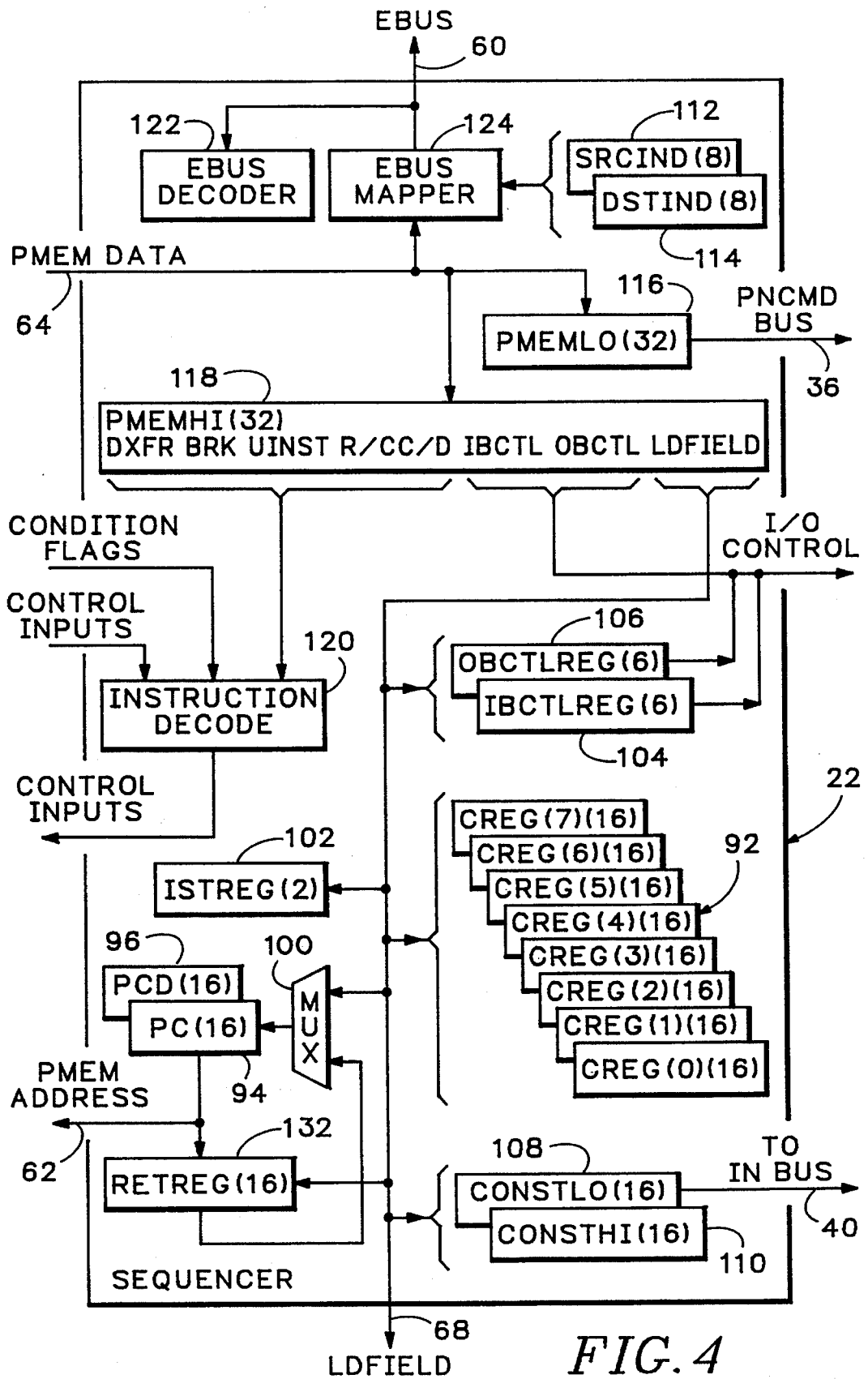
FIG. 4 is a block diagram of a sequencer portion of the controller component.

Referring now to FIG. 4, sequencer 22 will be described in greater detail. Sequencer 22, also referred to herein as transfer means, is provided primarily to control the flow of sequencing through the program (microcode) being executed by the system. It should be appreciated that a CSC is referred to, broadly, as a "sequencer", which has a specific architecture therein designated as sequencer 22. Sequencer 22 is operable to direct simultaneous control instruction (as an "instruction sequencer"), on PNcmd bus 36, and bi-directional parallel data communications, on INbus 40 and OUTbus 42, to and with PN array 16 across computational circuit interface 34, thereby synchronizing events occurring in PN array 16 with generally asynchronous events which take place outside of PN array 16.

Sequencer 22, in the preferred embodiment, includes eight registers which function as loop counters, and which are designated CREG 0–7, which are depicted generally at 92. These registers are written by the user and modified under program sequencer control to implement loops. If a looping conditional instruction is issued that contains the address of a CREG therein, the specified register is decremented and tested for 0. Once the register reaches 0, the register is no longer decremented. Program counter register (PCReg) 94 contains the address of the instruction currently being fetched in CSC 14. PCReg is modified according to the program, and must be initialized to point to the first instruction to be executed before execution of a sequence of instructions may begin.

Program counter delayed register (PCD) 96 holds the value of the instruction currently being decoded. The contents of this register are not used by the processor. The information is provided so that the user can monitor the address of the instruction being decoded because such address may not always be directly inferred from PCReg 94. PCD 96 provides a delayed memory reference so that the location of the instruction to be executed in the next clock is known in the event that the currently-being executed instruction contains a branching command. For example, if an exception condition occurs between a branch and the instruction following the branch, PCReg 94 will point to the branch target and PCD 96 will point to the instruction causing the exception. The foregoing explains why both PCReg 94 and PCD 96 are provided.

In the event that a delayed branch, such as is used in RISC architectures, is encountered, the branch will not take effect until the instruction after the branch command. PCD 96 keeps PCReg 94 at the proper location pending return from the branch. CP 12 also uses PCD 96 when the program is restarted following a branch. To summarize: PCReg 94 always points to the instruction currently being fetched; PCD 96 always points to the instruction currently being executed; therefore, PCReg 94 is always at least one instruction ahead of PCD 96, but may be anywhere in the instruction set while executing a branch instruction. In the case of a conditional branch, this technique is felt to be more efficient than "guessing" which instruction will be executed next and then discarding an erroneously fetched instruction.

A return address register (RETReg) 98 provides a 1-deep call stack. Whenever the program call instruction occurs, and the condition is true, the current PCReg+1, which is pointing to instructions past the call address, is loaded into RETReg 98. When a return instruction is reached, then the condition is true, the value of register 98 is loaded into PCReg 94 so that execution may start at the point where it left off before the call instruction was executed.

A switch (mux) 100 acts as a control to determine whether the input to PCReg 94 is from LOAD FIELD bus 68 or RETReg 98. If the system is returning from a call, RETReg 98 is selected. If the system is branching or making a call, LOAD FIELD 68 is selected. If the system is going to the next instruction, PCReg 94 is incremented.

Internal state register (ISTReg) 102 stores internal state information which is required for use in restarting CSC 14.

INPUT buffer control register (IBCTLReg) 104 is used to set the data input mode to be used during program execution when the programs specifies alternate (ALTin) or standard (STDin) input. The register contains two fields of three bits each, the first field, bits 0–2, provides control of standard input, and the second field, bits 3–5, provides control of alternate input. The codes contained in the fields indicate the byte and word size data and specify whether input is coming from direct input (DIRECTIN), external input, or CP memory 12a. In the case of direct input, direct data bus 24 and direct input buffer 46 provide INbus data source. The system is directed to read a byte from the parallel INPUT buffer 46 and, if the buffer is empty, causes CSC 14 to WAIT for the buffer to be filled. External I/O, block 66, may be specified, wherein the system uses external multiplexing of INbus 40. A WAIT is performed as necessary if required by the handshake mechanism, which will be described later herein.

An OUTPUT buffer control register (OBCTLReg) 106 is used to set the data output mode to be used during program execution when the program specifies standard (STDout) or alternate (ALTout) output. The register contains two fields of three bits each, similar to those used with the input buffer control register, and directs output to the output components which correspond to the input components controlled by the input buffer control register.

Two registers are provided to handle literals or to allow transfer of data between registers in CSC 14. The first register, constant low (CONSTLO) 108 allows literals to be taken from the program directly into PN array 16, or into registers in CSC 14 using the data transfer (DATAXFR) commands. Constant low register 108 may also be loaded from other data sources in CSC 14 and subsequently transmitted on INbus 40. The other register is constant high (CONSTHI) 110. This register is used in conjunction with constant low register 108 to create 32-bit values from LOAD instructions. Constant high register 110 may be loaded as a 16-bit constant by the LOAD instruction, or may be read/ written by a data transfer instruction. A PSEUDO register may be created by the concatenation of constant low register 108 and constant high register 110. This PSEUDO register may be accessed through CPIF 18 or a data transfer instruction.

Indirect registers are provided and may be used to supply addresses for indirect addressing in sequencer data transfer instructions. A source indirect register (SRCIND) 112 is used to supply the source address for indirect addressing in sequencer data transfer instructions. A destination indirect register (DSTIND) 114 is used to supply the destination address for indirect addressing in sequencer data transfer instructions. To perform indirect transfers, the user loads the appropriate register with a register pointer. Subsequent data transfer instructions will use the register as the source/ destination address if source/destination indirection is specified by the appropriate bit in the data transfer instruction.

A number of registers are provided for receiving data over data bus 64 from local internal program store in program cache (PMEM) 58. The first of these registers is identified as PMEMLO 116. This is a 32-bit register which contains the command that is to be placed on PNcmd bus 36 to the PN array. This register must be initialized by CP 12 before execution in system 10 may begin. Another recipient of data is PMEMHI register 118 which is a 32-bit register and contains the CSC program which is currently being decoded by an instruction decode 122. This register must also be initialized by CP 12 before execution may begin, because of the memory fetch pipeline.

As previously noted, sequencer 22 contains an EBUS decoder 122, which decodes an instruction received over EBUS 60. Sequencer 22 also contains an EBUS mapper 124, which determines whether the location being asked for uses INDIRECT source or INDIRECT destination, and applies the request to EBUS 60.

Program Cache

Figure 5:
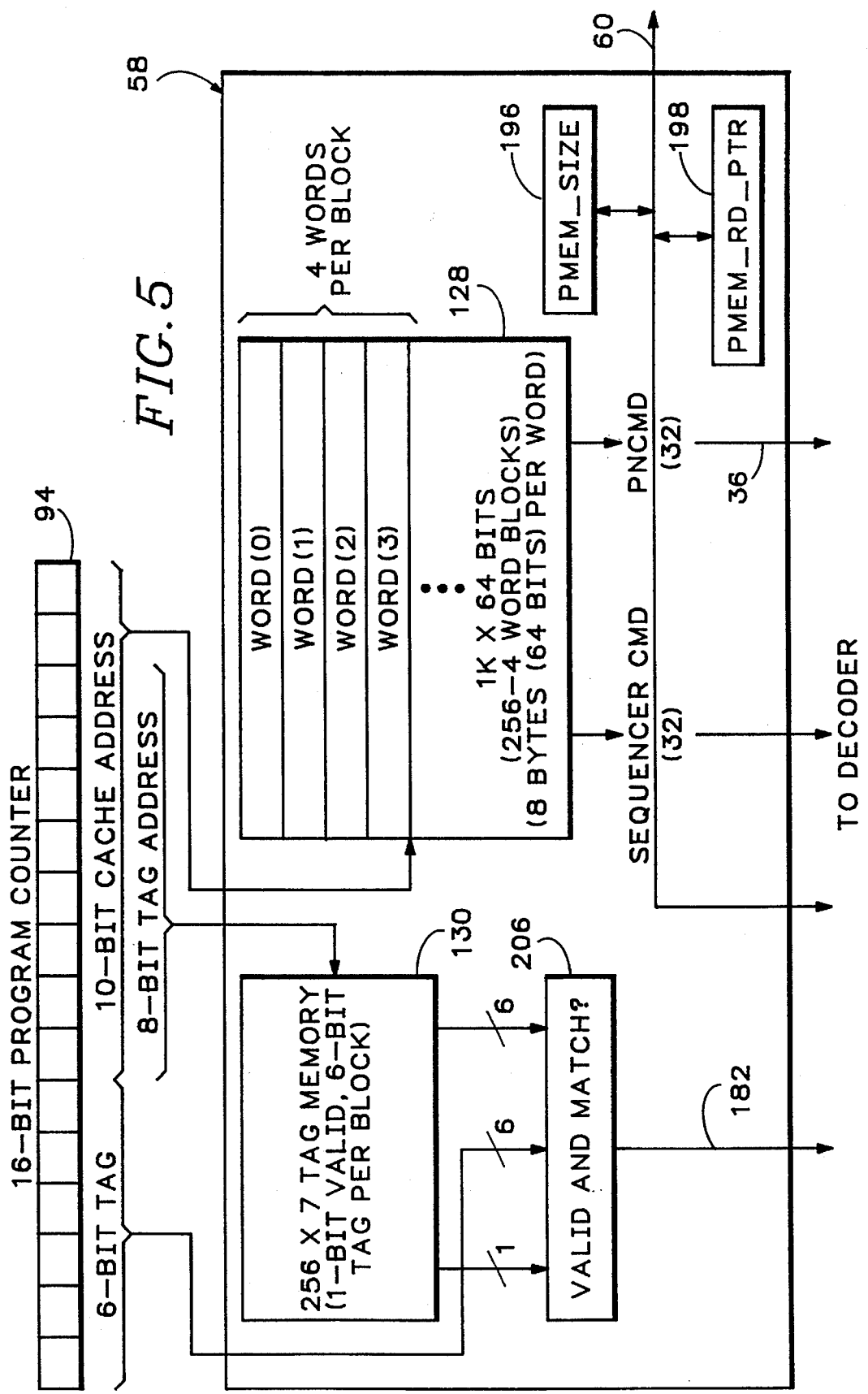
FIG. 5 is a block diagram of the cache implementation of the controller of FIG. 2.

Turning now to FIG. 5, the operation of program cache (PMEM) 58 will be described in greater detail. A first memory block 128 comprises what is referred to as an internal program memory, also referred to herein as a controlled memory segment. In the preferred embodiment, this is a 1K×64 bit program memory. It may also be used as a 2K×32 bit memory when accessed externally by CP 12. Memory block 128 will receive a 10-bit cache address from a 16-bit program counter, PCReg 94.

A second memory block 130 stores the block address or tag and a valid bit for each tag. In the preferred embodiment this is a 256×7 bit tag memory. Each 7-bit block includes one valid bit and a 6-bit tag. A comparator 132 is operable to determine validity and match a stored 6-bit tag with a 6-bit tag from PCReg 94.

A program has to be loaded into CSC 14 memory from CP memory 12a if caching is disabled. If caching is enabled, a pointer is loaded into CSC 14 PMEM_RD_PTR register 198 (FIG. 5). This register provides the base offset of the program stored in CP memory 12a. If caching is enabled, CSC 14 uses PMEM_RD_PTR 198 and PCReg 94 to calculate the address of the block to be fetched when a cache miss occurs. Once the appropriate state is initialized, the user can then begin execution of the programming in CSC 14. If the cache is disabled, the program must explicitly be loaded into PMEM 58. The program contained in CSC 14 will be initiated upon receipt of the proper command from CP 12. A PMEM_SIZE register 196 is used to perform bounds comparisons with PCReg 94 each time an instruction is fetched. Cache implementation is accomplished by means well known to those skilled in the art.

Register File

Turning back to FIG. 2 momentarily, register file 56 is, in the preferred embodiment, a collection of 64 32-bit registers which may be used by the programmer to store data, pointers, call parameters, etc. These registers are accessed over EBUS 60 for data transfer or host read/write access. The actual implementation of register file 56 consists of two 32-word register files. One file is mapped into all even addresses while the other is mapped into all odd addresses. Transfers may occur between the two register files in a single cycle if the transfer is between an odd and even address. Single cycle transfers within the same structure, i.e., even to even or odd to odd, are not allowed in the structure.

Arithmetic Logic Unit

Figure 6:
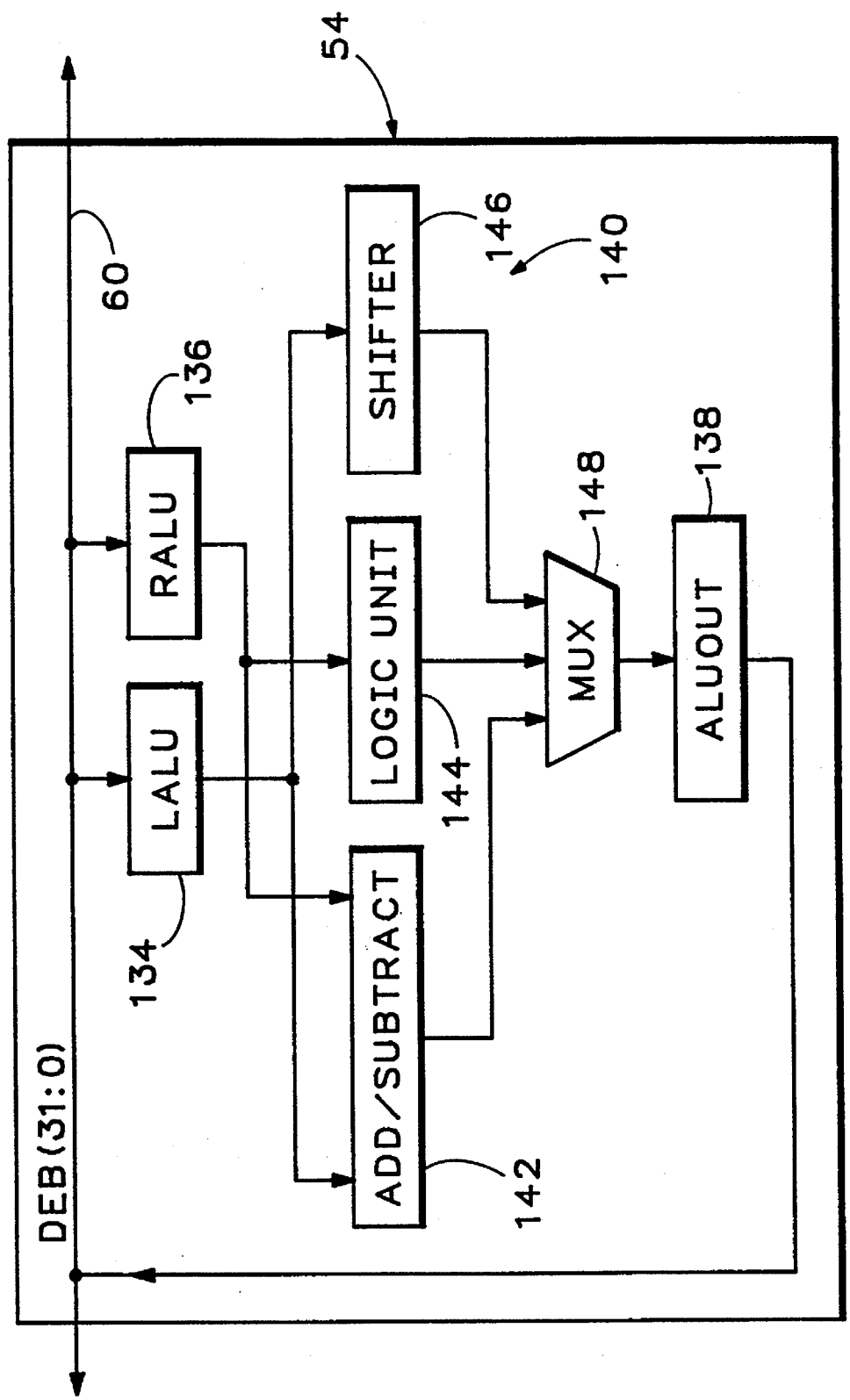
FIG. 6 is a block diagram of an arithmetic logic unit of the controller of FIG. 2.

Continuing the description of the CSC, and now referring to FIG. 6, arithmetic logic unit (ALU) 54 is depicted in greater detail. The ALU performs two main functions: 1) pointer arithmetic, and 2) data assembly and disassembly. ALU 54 is operable to generate addresses to locations in CP memory 12a which contain instructions and data, and which will ultimately be executed or acted upon by PN array 16. In the preferred embodiment, ALU 54 is a 32-bit general purpose structure and provides for pointer arithmetic, masking operations, and miscellaneous address manipulations. ALU 54 includes a left ALU input register (LALU) 134, a right ALU input register (RALU) 136, an ALU output register (ALUOUT) 138 and an ALU operational unit, shown generally at 140. Operational unit 140 includes an add/subtract unit 142, a logic unit 144, and a shifter 146. Output from operational unit 140 is transferred to ALUOUT 138 through a mux 148.

ALU 54 is accessed by EBUS 60, where input registers (LALU 134, RALU 136) hold the ALU operands. The output of ALU 54 will be located in ALUOUT 138 after registers 134, 136 or 140 are modified. ALUOUT register 138 is not latched and simply reflects the combinational results of the left, right and operational decodes. Operational register 140 latches the OPCODE field from the data transfer instructions that write to the left or right ALU registers. This opcode is decoded and provides control signals for the multiplexer and functional units which are selected for this specific function. ALU 54 can supply a 32-bit add/subtract function for unsigned arithmetic. Wrap-around occurs on result overflow. Logic unit 144 is provided to allow masking fields. The logic functions available include AND, OR, XOR, and COMPLEMENT. Operations that require only one operand, such as COMPLEMENT, use only LALU 134. Shifter 146 provides 1, 4, 8 and 16 bit shifts, left or right, on the left ALU contents. All shifts are pure, non-arithmetic. Truncated bits are lost and zeros are shifted in.

Data Transfer Instruction

Figure 7:
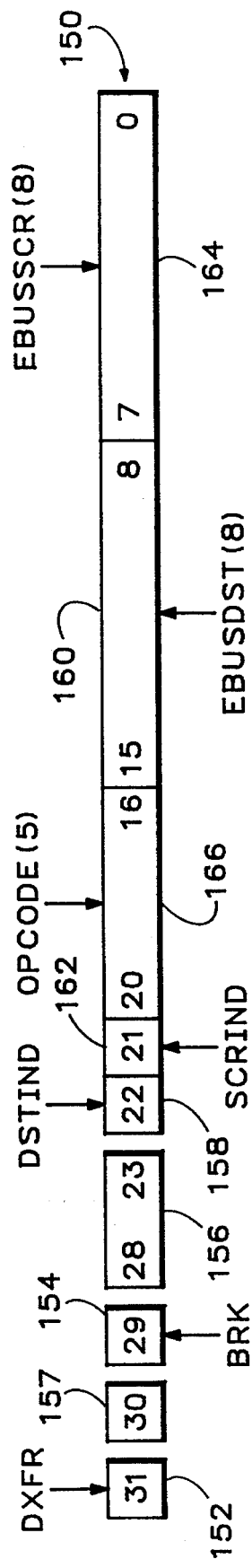
FIG. 7 is a block diagram of a DATAXFR instruction, depicting instruction fields.

The structure of a data transfer instruction will now be described. A data transfer instruction is decoded in sequencer 22 by EBUS mapper 124 and is transmitted over EBUS 60. The Data transfer instruction is decoded locally by CSC 14 components and the actual data is transferred over EBUS 60 in the following cycle. Referring now to FIG. 7, the structure of a data transfer function is depicted generally at 150. The data transfer instruction is 32 bits in length and includes, as assembled in the preferred embodiment, at bit 31, a DATAXFR code, block 152. If an instruction contains a "0" in block 152, it is a standard sequence instruction. If a "1" is present in block 152, the string is interpreted as a DATAXFR instruction. If a "1" is present in break block 154, bit location 29, a break point is indicated on the current instruction. Bit locations 23–28, block 156, and 30, block 157, are currently unspecified.

Bit location 22, block 158, is the destination indirect bit (DSTIND). If this bit is set, then the data destination specification, contained in bit locations 8–15, block 160, EBUSDST, is ignored and the value in the destination indirect register (DSTIND register) is used as the destination address. If bit location 21, block 162, the source indirect bit (SRCIND) is set, then the data in bit locations 0–7, block 164, which contain the data specification field (EBUSSCR) is ignored and the value in the source indirect register is used as the source address. Bits 16–20, block 166, contains the OPCODE, if any, that is related to the current destination. This field is currently defined for use with arithmetic logic unit 54.

Data transfer instructions are transmitted on EBUS 60, which operates a two-stage pipeline protocol. Each instruction is broadcast onto the EBUS as it flows out of memory in sequencer 22. The internal units of CSC 14 monitor the request and receive and transmit the EBUS data, if appropriate. All internal units monitor transmissions over EBUS 60.

Data transfer instructions are operable to allow the user to specify data transfers within CSC 14 over EBUS 60 between internal structures. This includes access to most internal state, register file 56 and ALU 54.

Data transfer instructions are passed over EBUS 60. They are the only instructions which use the EBUS. When an instruction reaches mapper 124, indirection is resolved and the data transfer request is transmitted over EBUS 60. If the data transfer involves sequencer 22, EBUS decoder 122 drives control lines within sequencer 22 to other units in sequencer 22. Most of the control lines are not shown in the drawings for the sake of clarity.

It should be noted that, for the most part, each component which is connected to EBUS 60 has its own EBUS decoder. The component decodes an instruction to determine whether it needs to do anything as a result of the instruction. It is believed that such structure and techniques are well known to those skilled in the art.

The decoded instruction will generally tell a component or unit to take a particular block of data off of EBUS 60 and place it in a particular register, or place a particular block of data which is contained in a register on EBUS 60. Mapper 124 will put an instruction on EBUS 60 in one clock, which is usually the same clock in which the instruction was fetched. Each component of the CSC will look at the instruction to determine whether it is a source or destination, or not involved. If a component is a source, it puts data on the EBUS on the second clock. If the component is a destination, it takes data from the EBUS on the second clock. Mapper 124 determined whether direct or indirect addressing will be used.

CPIF

Figure 8:
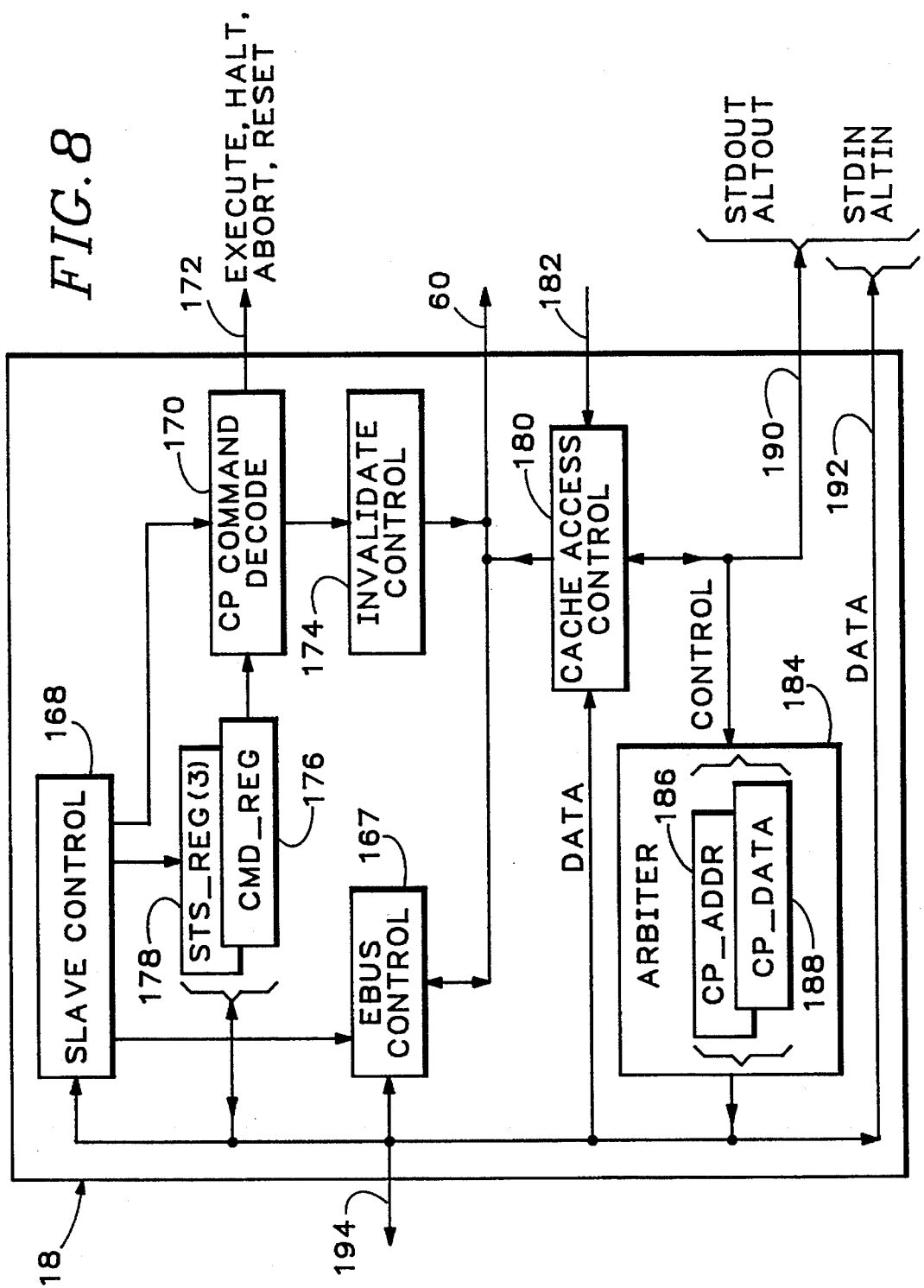
FIG. 8 is a block diagram of the host interface of the system of FIG. 1.

Referring now to FIGS. 3 and 8, control processor interfaces (CPIF) 18 and 73 will be described in greater detail. A CPIF includes all of the logic required to perform slave and master memory transfers, control circuitry associated with CP functions, and access CSC internal state via EBUS 60. Although shown as a discrete block, it should be appreciated that, in the preferred embodiment, CPIFs 18 and 73 are part of their associated CSCs.

CPIF 18, for example, includes an EBUS control 167, which controls the flow of data between CP 12 and the CSC. CPIF 18 includes a slave control 168 and a CP command decode 170, which together, provide various commands which reside in CPIF 18. These commands are RESET, HALT, ABORT, INVALIDATE_CACHE and EXECUTE. CP commands are transmitted over a CP command line 172. Additionally, invalidate control 174 may issue an INVALIDATE_CACHE sequence over EBUS 60 to INVALIDATE CACHE tags in program cache 58.

CPIF 18 contains two types of registers which are accessed directly by CP 12, and do not rely on EBUS 60. The first such register type is command register (CMD Reg) 176. Three read-only status registers (STS_Reg [0, 1, 2] are represented at 178 and are used to reflect various current CSC state. Both CMD_Reg 176 and STS_Regs 178 are available to CP 12 at all times, and provide means whereby state information in CSC 14 is available to CP 12.

The preceding components perform functions that are associated with slave operations. The following functions are associated with master control. A cache access control unit 180 requests access to EBUS 60 in the event that there is a cache miss. The occurrence of a cache miss is transmitted to CPIF 18 over a cache miss line 182.

An arbiter 184 includes, in the preferred embodiment, two 32-bit registers: CP address (CP_ADDR) 186 and CP data (CP_DATA) 188. Commands are issued over command lines 190 and 192 to request/select cache access control, standard output (STDout), alternate output (ALTout), standard input (STDin) or alternate input (ALTin).

CPIF 18 is linked to host 12 by means of a CP memory/data/address control bus 194. CPIF 73 is linked to host 12 by means of a CP memory/data/address control bus 195.

System Operations

Referring now to FIGS. 1–8, system operation will be described, using CSC 14, CPIF 18 and PN array 16 as exemplary structure. CP 12 communicates through a memory mapped interface to CPIF 18, which includes standard bus structure, believed to be well known to those of ordinary skill in the art. CSC 14 is configured through this interface by writing to all CSC state with the CSC in IDLE mode. CSC state includes CREGs 0–7 92, PCReg 94, and various pointers to data and program memory spaces in CP memory 12*a*.

In order to access CSC 14 state, CPIF 18 uses EBUS 60 to read and write to the various internal blocks. All CSC state is externally accessible to CP 12 in IDLE mode: sequencer 22 is configured by writing various CSC states via EBUS 60, and can manipulate all the states, including pointers to data, memory space allocation, and CP memory 12*a*. As used herein, "state" refers to groups of bits or words that have meaning to program logic and whose values are retained by the hardware indefinitely. Generally, "state" is stored in a flip-flop or register that retains the bits or words.

After initialization, which includes setting a number of registers in sequencer 22 to "0", and loading CP 12 I/O pointers and status bits, CP 12 writes a CP command to CMD_Reg 176 in CPIF 18 to begin processing. CSC 14 then becomes master of the CP memory bus, and internal control of CSC 14 is passed to sequencer 22. This is described as the RUN mode, which will be described more fully later herein.

As previously noted, and now referring to FIG. 5, a cache block, in the preferred embodiment, is a contiguous 32 byte block in program cache 58. CP 12 can load a program into a first memory block 128 and start CSC with an EXECUTE command. The CSC will RUN from the instructions contained in memory block 128. In the normal mode, with caching disabled, this functions as an internal memory and provides 10-bit addressing for 1K of memory. Commands from mode register 59, also referred to herein as means for selectively operating memory block 128, dictate whether memory block 128 functions as a memory cache or as RAM storage.

If a program is larger than 1K, a cache mode should be enabled by CP 12, which adds a second operating mode to memory. This requires trading a little performance degradation for a large increase in the size of memory. Memory addressing then requires 16 bits, as opposed to 10 bits, to resolve the storage.

Cache mode is turned on by a bit in mode register 59, contained in CSC 14, and set by CP 12. Second memory block 130 contains 256×7 tag memory, which includes 1-bit valid and 6-bit tag per block. CP 12 clears tag memory by issuing an INVALIDATE CACHE command.

Assuming that, initially, program cache 58 is empty, a system address is provided, which sets a pointer of 32 bits in PMEM, i.e., PMEM_RD_PTR 198. The program initially tries to fetch the data at the address contained in PCReg 94. A 'valid bit' is tested to see whether the address block is valid. If the valid bit contains a "1", the addressed block contains a valid block. If the valid bit contains a "0", the addressed block is empty, and cache address control 182 causes the missing block to be fetched from CP memory 12*a*. Sequencer 22 uses PCReg 94 plus PMEM_RD_PTR 198 as the CP memory 12*a* address of the missing block. If the valid bit is "1", then the address tag for the addressed block is checked against PCReg 94. If the two addresses match, the requested program word is fetched from the addressed block in cache 58. If the addresses do not match, a block fetch, as described above, is performed.

Sequencer 22 has direct access to program cache 58 (PMEM) and will normally begin to execute the program contained in the program cache. In the event that a cache block (CB) is missing, sequencer 22 will request, through CPIF 18, a block from CP memory 12*a*. Once the block is retrieved and loaded into program cache 58, the sequencer will begin to execute the program in cache 58.

During RUN mode, sequencer 22 controls data flow and instruction flow over EBUS 60, PNcmd bus 36 and the various I/O processing blocks. When the CSC is operating in RUN mode, INbus 40 and OUTbus 42 may be sourced/sinked by DIRECTIN buffer 46, OUTbus PIPE, or the CP I/O buffers 44/50. The CP I/O data buffers may communicate directly with CPIF 18 for normal transfers and with EBUS 60 for state access. ALU 54 and register file 56 may be accessed via EBUS 60 from CPIF 18, or bus sequencer 22 for data transfer instructions.

Another feature of CSC 14 is its ability to define virtual data channels for communication between CP 12 and PN array 16. The four physical I/O channels designated STDin, STDout, ALTin and ALTout are generally used for the transfer of data between CP 12 and PN array 16. A large number of virtual channels may be implemented by programming (means for forming virtual channels). If a particular physical channel will be unused for a period of time, then the data that is sitting in the channel will be stored, and the channel used for transfer of a new piece of data. The user will see only a slight degradation in system performance during the formation and use of a virtual channel.

Virtual channels are established by software control of the four I/O channels between CSC 14 and CP 12. Each virtual channel points to a different part of CP memory 12*a*, and the software performs a switching function to select a particular virtual channel as access to a specific portion of CP memory 12*a* is required.

CSC State

All internal CSC state and program memory are mapped into CP memory 12*a* and may be accessed through CPIF 18 in four-byte longword format only, in the preferred embodiment. Access to cache tag memory 130 is supplied primarily for testing the system. PMEM 58 access is used to load CSC 14 memory when caching is disabled.

Sequencer Function

The heart of system 10 is sequencer portion 22. Sequencer 22 contains all logic to control program execution from program memory (PMEM). The sequencer must generate a PMEM address and accept the program word from PMEM. It must then decode the instruction and act accordingly. There are two distinct types of commands: sequencer and data transfer. A single bit in the instruction word is used to determine the instruction type. Inputs to sequencer 22 include:

- Condition flags: which include various conditions which exist externally to the sequencer which are required for conditional loop testing.
- Control Inputs: which include global controls and mode signals such as
- CACHE ENABLE, RUN, RESET, etc.
- PMEM Data: which contains 64-bit instruction words from PMEM.

Outputs of sequencer 22 include:

- PMEM Address: address for PMEM which is supplied by PCReg 94.
- PN Command: the PNcmd bus 36.

I/O Control: which provides outputs that instruct INPUT/ OUTPUT buffers 44/50, the direct data channels and the external data channels how to handle data.

CONSTBUS: which supplies the eight least significant CONSTLO bits to the INbus block.

LDFIELD: for sending the LOAD_FIELD to the status register for system calls.

Control Outputs: which consists of several miscellaneous signals that signify conditions such as break, bounds violation, flush-out, cache miss, cache fetch request and system call.

Bi-directional signals include:

CEB: which is the EBUS 60 control interface. This bus supplies the source and destination addresses for the EBUS transfers request.

DEB: which is the EBUS 60 data interface. This allows the sequencer to source and sink EBUS 60 as controlled by request from CEB.

Sequencer 22 includes instruction latches which accept an instruction from PMEM (program cache 58) whose address is supplied by PCReg 94. There are two distinct instruction types: those which explicitly control program and I/O flow (sequencer), and those that implicitly control program and I/O flow while explicitly controlling some data transfer within CSC 14, i.e., a data transfer instruction.

If the instruction is of the data transfer type, it is applied to EBUS 60 by EBUS mapper 124. EBUS mapper 124 combines the instructions with the contents of SRCIND register 112 and DSTIND register 114 to apply a data transfer command to EBUS 60 in the same cycle as the command flows out of program memory. EBUS 60 is monitored by all blocks, and, if appropriate, the blocks respond in the following sequence if execution continues: data transfer commands imply sequential PC flow, loop back for INbus 40 and NOOP for OUTbus 42. EBUS decoder 122 monitors EBUS 60 and controls read/write access to the sequencer registers.

In addition to the data transfer instruction type, there are sequencer instructions which require program flow logic to implement sequential flow, conditional branching, and a single call and return function. CREG 0–7 92 are provided for looping instructions, while CONSTLO register 108 and CONSTHI register 110 are used for introducing literals into CSC 14. The I/O flow control fields in the instruction are used in conjunction with IBCTLReg 104, OBCTLReg 106 and a mode control register (not shown) to control I/O flow. The mode control register is located in the CSC and is part of the externally addressable CSC state. OBCTLReg 106 and an OUTbus control field are used to generate OUTbus control signals that must be delayed one cycle in order to match up with the appropriate OUTbus data. Like the OUTbus PIPE 48, this pipe must run out one additional clock when executing stops, or when CSC 14 is in a SPIN mode.

The load field of the instruction is available to some of the sequencer registers and is an output of the sequencer block. This provides a means for loading constants into sequencer 22's registers by program instructions. The load field is also sent to the state register in CPIF 18 for system call termination type determination.

Figure 9:
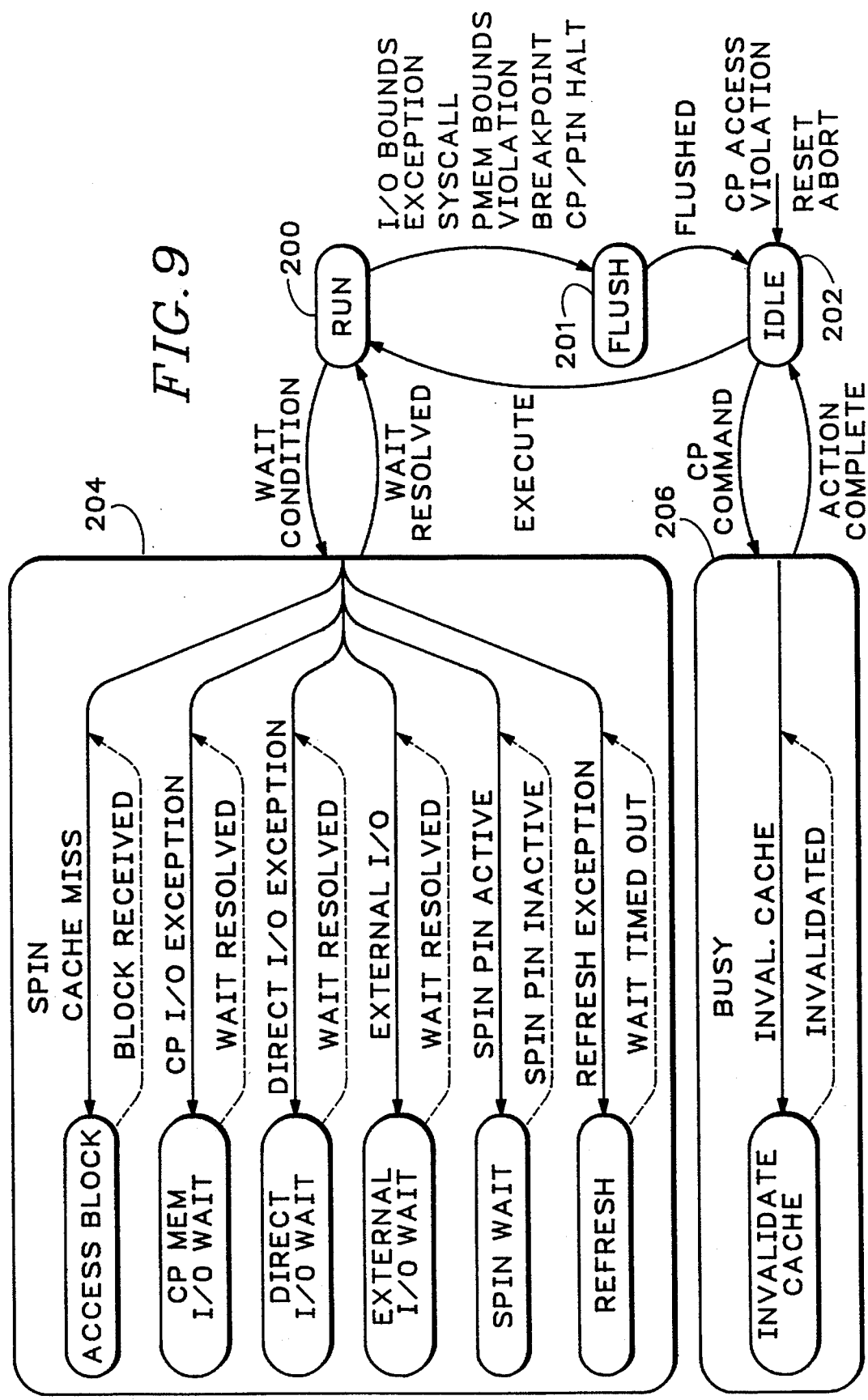
FIG. 9 is a schematic representation of the State and Condition protocol of the controller of FIG. 2.

Referring now to FIG. 9, the state conditions of CSC 14 will be more fully described. When CSC 14 is executing program, it is in RUN mode, block 200. RUN is the normal executing mode and is entered as a result of the EXECUTE CP command given by CP 12, from IDLE, block 202. IDLE is a mode in which CSC 14 is not running, and is waiting for instructions from CP 12 to perform some function. IDLE is always entered on power-up, RESET, HALT, EXCEPTION conditions, or CP access violations. When CSC 14 is in IDLE, CP 12 is the bus master, and PAUSE is asserted to PN array 16. FLUSH is a state which is entered by CSC 14 anytime a switch is made from RUN to IDLE. When CSC 14 is in FLUSH mode, CP 12 data write buffers are emptied into CP memory 12a, regardless of the current full status. After the data write buffers are empty, CSC 14 will return to IDLE. During FLUSH mode, PAUSE is asserted to PN array 16.

Some conditions exist which will cause CSC 14 to stop execution, at least temporarily. These conditions fall into two major categories. The first category is what is referred to herein as SPIN conditions, block 204, while the second condition is BUSY, block 206. SPIN conditions are those that cause a temporary wait and put CSC 14 into SPIN mode. Another form of condition, not shown in FIG. 9, is an EXCEPTION condition, which will cause CSC 14 to stop execution and place the system into an IDLE condition. If an EXCEPTION condition and a SPIN condition are encountered concurrently, EXCEPTION conditions always take priority over SPIN conditions. Because of the requirements of PN array 16, CSC 14 must always SPIN for an even number of cycles, regardless of the condition which resulted in the SPIN. A SPIN condition suspends program execution and asserts a PAUSE to PN array 16.

EXCEPTION conditions cause CSC 14 to switch from RUN to IDLE, which stops program execution completely. This occurs upon various break conditions as well as CP 12 halt or reset.

In normal cases, CP 12 will only access CSC 14 when CSC 14 is in IDLE mode. CP 12 must poll CSC 14 STS_Reg 178 to see if CSC 14 is in IDLE mode before accessing the CSC. CP 12 may, however, issue a HALT or RESET through CMD_Reg 176, which forces CSC 14 into IDLE. If CP 12 tries to access CSC 14 state other than through CMD_Reg 176 or STS_Regs 178, and CSC 14 is not IDLE, a CSC ACCESS VIOLATION occurs and the CSC returns to IDLE. If a CP command other than HALT or RESET is issued, and CSC 14 is not IDLE, CSC 14 will accept the command into CMD_Reg 176, but the command will be ignored.

There are a number of situations where CSC 14 must suspend operations, or SPIN. Whenever in SPIN mode, CSC 14 asserts a PAUSE signal to PN array 16. PAUSE causes PN array 16 to cease execution and ignore the contents on the PNcmd bus 36. When PAUSE is no longer asserted, PN array 16 begins execution where it left off. No data are lost during such an operation. The contents of OUTbus 42 are saved by CSC 14 in OUTbus PIPE 48.

Block 204 in FIG. 9 lists, in order of priority, all of the conditions which may cause CSC 14 to enter SPIN mode. The conditions, in order of priority, are as follows:

Cache Miss/Access Block: during a cache miss, SPIN mode is entered and CSC 14 takes control of CP bus 194 in a burst mode and fetches the required program block. Other WAIT conditions which do not require the use of CP memory bus, such as direct, external, or refresh may occur and be resolved concurrently with the block fetch. Since CP I/O WAIT and CACHE must access the CP memory bus, a priority must be defined. When these events occur simultaneously, the service priority is CACHE, STD_RD, ALT_RD, STD_WRT, and ALT_WRT. After all conditions are resolved, CSC 14 returns to RUN mode, if no other WAIT conditions are pending.

CP Memory I/O Wait: if there is a delay in the I/O buffer 44, 50 reading data from CP memory 12a or writing to CP memory, and the program requests additional reads or writes respectively, sequencer 22 enters a SPIN state until the read or write can proceed. This is part of the system synchronization function.

Direct I/O Wait: if sequencer 22 requests a byte from direct parallel input buffer 46 and there are no data words in the buffer, SPIN mode is entered until a data word is deposited by some external source. Additionally, if a write is attempted to the direct output buffer 52 and there is no room in the direct output buffer, SPIN mode is entered until there is room in the buffer. The handshake protocol for direct I/O allows maximum bandwidth.

External I/O Wait: if sequencer 22 attempts an external I/O transfer, and the remote device(s) are not ready to send/receive data, SPIN mode is entered until the external devices are ready.

DRAM Refresh: if DRAM is used in a PN array, and refresh count periods have occurred, the PAUSE signal is asserted for two clocks. The individual components of PN array 16 maintain their own refresh address counters and state sequencer.

FLUSH: when the FLUSH instruction in encountered, CSC 14 must SPIN until CP output buffers are flushed. After being emptied, CSC 14 returns to RUN mode and begins execution at the next instruction.

During SPIN mode, all sequencing ceases and no additional words are fetched. Additionally, the OUTbus to INbus pipeline 48 is suspended and the data held until RUN is entered. CP 12 may query the status register (STS_Reg 178) to determine the state of CSC 14, which will also include the reason that CSC is in SPIN mode.

CSC 14 may enter BUSY mode from IDLE when given a command by CP 12 to perform some multi-cycle task. One of the CP commands which will cause CSC 14 to enter BUSY is INVALIDATE CACHE.

CP 12 must perform a variety of operations in order to initialize or perform context switching in the CSC. Although RESET is used initially to bring the CSC to a stable configuration, additional RESETs are applied to ensure that changes made in CSC state are returned to initial conditions in the event that CSC 14 inadvertently enters an infinite loop.

There are several major classes of CSC state that must be accounted for by CP 12. The first is that the control state must be initialized in order to execute instructions. Secondly, configuration registers which point to CP memory must be cleared or initialized. There are states which do not have to be initialized, but which must be saved or restored when switching contexts. Program memory storage must be considered. There are also states that do not need to be initialize or are not involved in context switching. The state of the CSC command (CMD_Reg 176) and status (STS_Reg 178) registers must be confirmed. Anytime CSC 14 switches from RUN to IDLE, the CSC will interrupt CP 12. CP 12 may access STS_Regs 178 in order to determine the cause of the interrupt. Before interrupting CP 12, CP data output buffers will be flushed. When switching CSC context, CP 12 must save all relevant state in order to restore such state later.

CSC 14 enters IDLE when halt, reset or various exception conditions occur. When CSC 14 is in IDLE, PAUSE is asserted to PN array 16 and CSC 14 is inactive. When IDLE, CP 12 may access all internal CSC state. If CP 12 issues an INVALIDATE_CACHE command, CSC 14 enters BUSY and returns to IDLE when the action is complete. When CP 12 issues an EXECUTE command, CSC 14 enters RUN mode and begins execution. At a minimum, PCReg 94, PCD register 96 ISTReg 102, PMEMLO 116 and PMEMHI 118 must be initialized before execution may begin.

Once running, a number of situations may cause CSC 14 to stop execution, such as encountering a break point, an I/O or PMEM bounds violation, or a system call execution. In these situations, CSC 14 enters IDLE, via FLUSH, and asserts PAUSE to PN array 16.

The CSC may execute a program, which may be cached or non-cached. In the case of I/O processing, the changing and modifying of weight/pointers to various data files includes manipulation of the addresses. A pointer indicates the base of a file in CP memory 12a. During processing, as data is fetched into a buffer and then placed on INbus 40, the pointer is changing to a new location.

Pointer Manipulation

CSC 14 is capable of pointer manipulation which allows a programmer to perform pointer arithmetic in a SIMD/neural network environment. Pointer manipulation may be as simple as providing an address in CP memory 12a as a result of a computation. It may be used to provide an arbitrary sequencing through vectors of data, such as random access, or the "sliding window", described later herein. CSC 14 is also able to synchronize the I/O to PN array 16 which arrives/departs through CSC 16/CPIF 18, direct I/O or external I/O. Those who are skilled in the art will appreciate the various kinds of pointer manipulation that are done during signal processing. The CSC and CPIF of the invention provide an architecture which allows pointer manipulation within the context of a SIMD/neural network array, which provides a user with means to sequentially address portions of data in a data stream in CP 12 by performing calculations to determine addresses. Pointer manipulation is combined with the synchronized computation architecture of the PN array.

There are a number of different ways in which the "new" address or location may be determined. (1) It may be necessary to manipulate the same data again at the end of a sequence. In this case, the original value of the location is stored in a general purpose register file, and reloaded into the pointer. This will fetch the original version of the previously manipulated data for further manipulation. (2) The program may need to branch to a new file, in which case the address of the new file is stored as a pointer. (3) The system may need to alternate between various locations, i.e., initially working on a file, working on a new file, returning to the original file, etc. In this situation, the buffers need to be flushed, or reset to "∅". The buffer enable bit in mode register 59 controls the operation of the CSC. (The CSC is provided with Intel®/Motorola® bits to determine which memory addressing format to use between the various readily available microprocessor chips. The selection of the format is determined by a coded bit in mode register 59.) The buffer control will turn off the buffers when not in use to prevent random reloading. (4) A machine may be programmed to provide a buffer windowing feature as another type of pointer modification.

Figure 10:
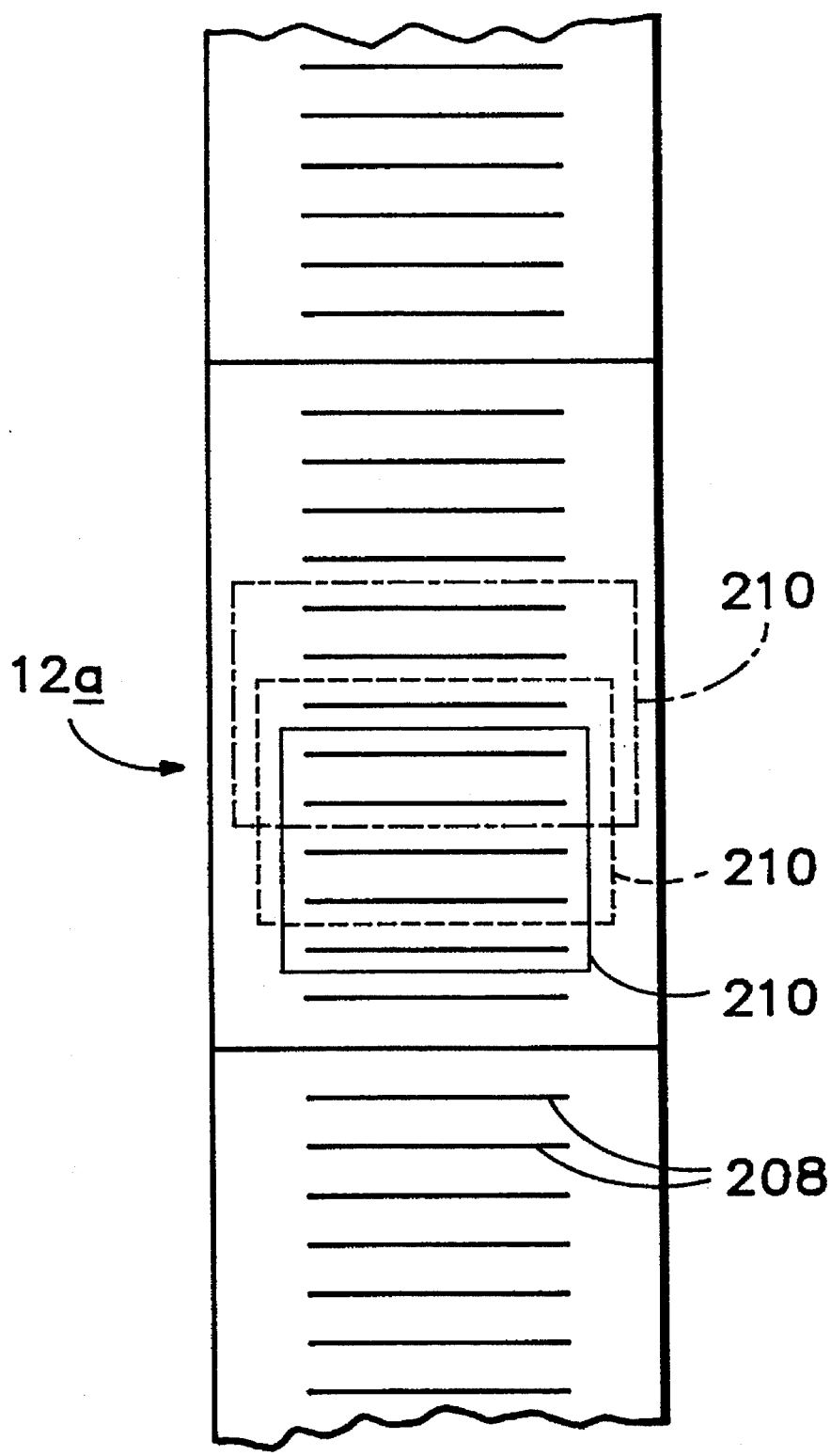
FIG. 10 is a partial schematic representation of a windowing feature of the invention.

Referring now to FIG. 10, a buffer windowing feature, which is an example of complex I/O processing, of the system is diagrammatically presented. The system is operable to sequentially analyze data in a window of memory, such as memory unit 12a in CP 12. A "window" is a subset of a sequential data file of a set of data which has been read into CP memory 12a. Whenever the CP memory is accessed through any of the system busses, CSC 14 maintains a pointer in the I/O buffers to track the memory address. CSC 14 has the ability to access a segment of data, and to move within that segment as required. As represented in FIG. 10, a portion of CP memory 12a is depicted. The solid horizontal lines, such as lines 208 represent a word stored in memory. A box 210 represents a segment, or "window", of stored memory which has been accessed under instructions from CSC 14. Such a window feature may be used, for example, in a speech recognition application. Window 210 may be sequentially shifted to its next location, as depicted by dashed lines 210, as a pointer is incremented to take the next word in the segment of data. A dashed-dot segment 210 indicates a movement of the window to yet another location in memory. This system is also operable to synchronize computational system 10 with CP 12.

CPIF Function

Handshake protocol for bus transfers between CPIF 18 and a CSC consists of bus arbitration and memory transfer handshake signals. The CSC may act as a slave memory device or a master. Referring to FIG. 8, if CPIF 18 is functioning using those components above EBUS 60, CSC 14 is operating in a slave mode. If CPIF 18 is functioning using those components below EBUS 60, CSC 14 is operating as a master controller. All transfers are 32-bit longwords. The address and data buses are both 32 bits. The CSC also supplies a CP interrupt, which is asserted whenever the CSC switches to IDLE, and is negated when any STS_Reg 178 is read. When CSC is IDLE, it is in the slave mode, and CP 12 may access all internal state. The slave logic decodes the access and controls that read or write. If the access is read from any of STS_Regs 178, or a write of CMD_Reg 176, a direct two-cycle access is performed. If the access is to other internal state, the access occurs over EBUS 60 through control logic in CPIF 18.

CP 12 must not read or write any EBUS 60-access state without first insuring that the CSC is in IDLE mode. This is accomplished by reading STS_Regs 178. When a CSC is IDLE, it functions as a slave, and all internal state is accessible. If a CSC is not in IDLE, CP 12 is only permitted to read/write to/from CMD_Reg 176 or to read STS_Regs 178. If CP 12 attempts to access any state when a CSC is not IDLE, an interrupt is issued, placing the CSC in IDLE and a CP access violation condition is reflected in the STS_Reg, requiring that the system be RESET.

CMD_Reg 176 is the only means, except for simple state access, that CP 12 has in order to initiate actions within a CSC. This register is written to by CP 12, and the contents are interpreted as instructions that must be decoded and executed by CP command decode 170, which transmits a proper instruction over command line 172. As previously noted, the commands which are available are RESET, HALT, ABORT, EXECUTE and INVALIDATE_CACHE. All logic which is required to decode and execute these commands resides in CPIF 18. The assertion of a RESET, HALT or ABORT command will force the CSC into IDLE mode. The EXECUTE command sends a sequencer start request to the top level master controller. Logic required to fetch a cache block is also located in CPIF 18. Upon receiving an INVALIDATE CACHE command, a CSC switches to busy mode, and sequentially loads the entire tag memory with zeros via EBUS 60.

STS_Regs 178 reflect various current CSC states, and are available to CP 12 at all times. Various exception and SPIN conditions are indicated as well as the current operating mode. CP 12 should always read a STS_Reg to determine the CSC current mode before trying to access any other CSC state information.

When a CSC is in a RUN or SPIN mode, several internal units can request use of the memory bus. If a CSC is not using the memory bus, CP 12 can access CMD_Reg 176 or STS_Regs 178, even though the CSC is running. Arbiter 184 accepts requests and controls access to the memory bus. The following units, listed in order of priority, may access the memory bus: CACHE, STDin, ALTin, STDout, or ALTout.

A cache request has priority over all other requests. If there is a cache miss, cache access control unit 180 will request access to EBUS 60. After completing the current access, the cache request will be serviced and four blocks (eight longwords) will be accessed. The remaining requesters are served in order of priority, and like the cache, the arbiter attempts to fill/empty all remaining locations available before moving onto a different unit, unless a cache request is present. By completing the function with a particular requester until all locations are full/empty, memory bandwidths may be increased because of the tendency of subsequent, sequential accesses to/from DRAM.

In the case of a read, by CACHE, STDin, or ALTin, CP address (CP_ADDR) 186 holds the address until the data is received. The data goes directly to the requesting unit. For writes, the address and data are held in CP_ADDR 186 and CP_DATA 188 until the write is complete, respectively. These registers are required so that the requesting units can set up for their next access while the current access is performed.

When a cache miss occurs, sequencer 22 signals CPIF 18 over cache miss line 182 and provides the base address of the first long word to be fetched. The cache request address generation logic takes this first address, waits for control from arbiter 184, and then makes eight sequential long word reads. This unit accepts the data as it is read from memory and performs writes, over EBUS 60, to the required PMEM locations.

If CP command decode 170 asserts RESET, the CSC resets itself and the PN array, regardless of the operating mode. RESET causes the CSC to enter the IDLE mode without flushing data or commands from its various buffers/registers. If HALT is asserted, the CSC stops action and treats the command like a break point if it is in RUN mode. This allows the HALT instruction to be restarted. The flush state is entered upon receiving a HALT. When CP 12 write buffers are empty, the CSC returns to IDLE. If the CSC is in BUSY or IDLE mode, a HALT instruction has no effect, because sequencer 22 is not running.

If command decode 170 asserts ABORT, the CSC will immediately switch to IDLE mode without attempting to flush any buffers. This is equivalent to a HALT without flush. This command is used to stop the CSC under unusual circumstances while leaving internal state intact.

Upon insertion of an EXECUTE command, the CSC will initiate program sequencing at the address specified by PCReg 94, which must be set up before EXECUTE is issued. If caching is enabled, all cache blocks must be explicitly made invalid via CP command decode 130 before the EXECUTE command is issued.

If an INVALIDATE CACHE command is issued, all cache entries are made invalid whether caching is enabled or not. This forces a CSC to a BUSY mode for 256 clock cycles, while the tags are reset.

STS_Reg 178 includes three major registers, which are designated STS Reg [0], STS_Reg [1] and STS_Reg [2]. STS_Reg [0] is the highest level STS_Reg. It contains high-level state and IDLE status. STS_Reg [1] functions as a SPIN and BUSY indicator. The appropriate SPIN and BUSY bits are active whenever the CSC is SPINning/BUSY, or when a HALT or RESET is issued while the CSC is in a SPIN or BUSY mode. STS_Reg [2] contains the LOAD FIELD of the system call instruction, causing termination. If the termination status is other than under a system call, the contents of this register are undefined.

PMEM_SIZE register 196 contains the number of eight-byte words of program space above the PMEM_RD_PTR 198 and indicates the program boundary. This value is not an address, but rather a micro-instruction word count. Whether caching is enabled or disabled, branches or execution beyond the bounds indicated by PMEM_SIZE cause a PMEM bound exception condition. As with I/O bounds exception, the sequencer behaves as if a break point was attached to the offending instruction. The instruction is not executed and all state is left in tact.

PMEM_RD_PTR register 198 contains the base address in CP memory 12a of the program to be fetched, or the base of the program cache image. This is an absolute address that must be 32-byte aligned.

OUTbus PIPE

Figure 11:
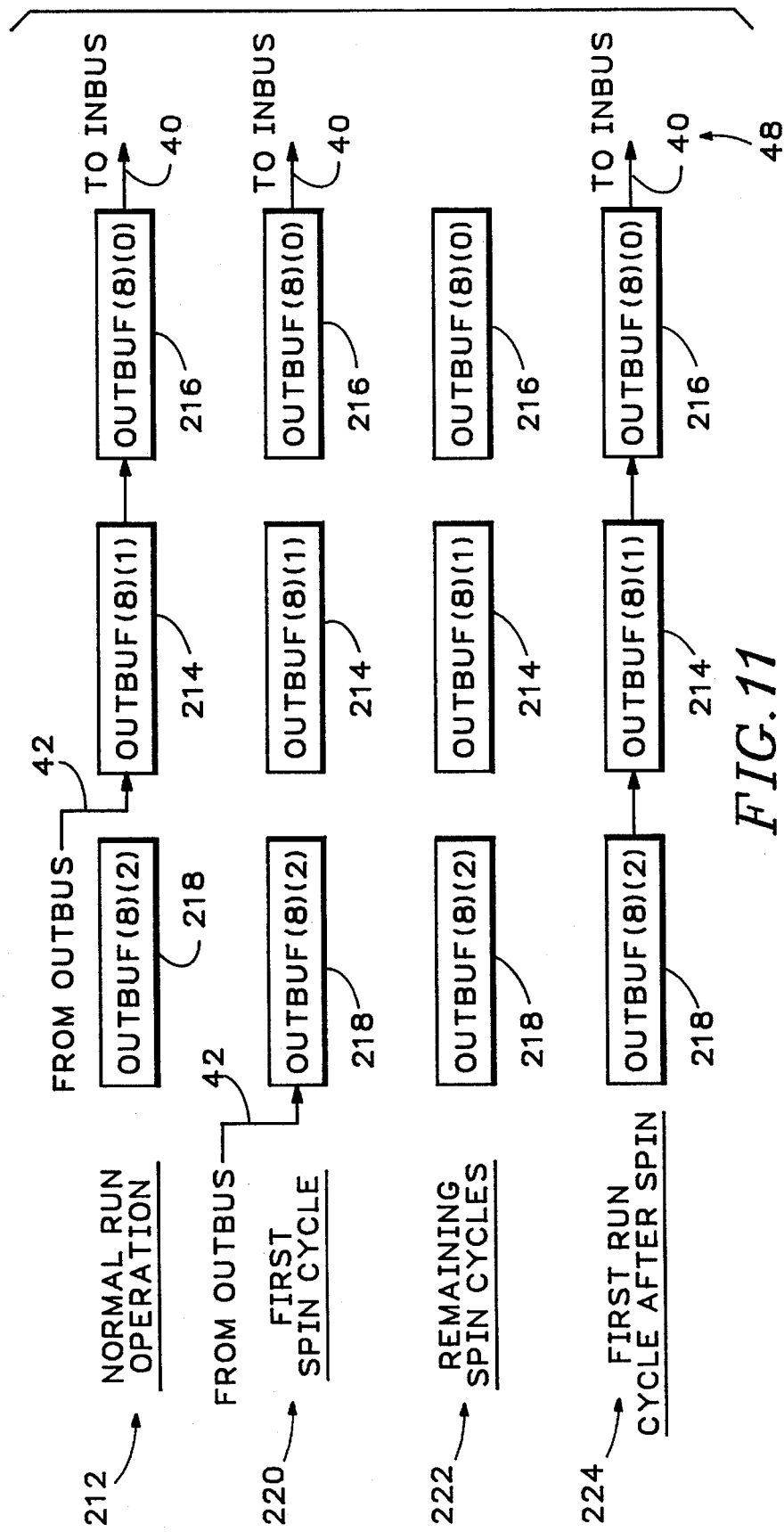
FIG. 11 is a block diagram of the OUTBUF pipeline operation of the computational system of FIG. 1.

Referring now to FIG. 11, the operation of the OUTbus to INbus pipeline (OUTbus PIPE 48) will be described. This pipeline is used to feed data placed on OUTbus 42 by PN array 16 back around to INbus 40. This is done when the user specifies loop-back (LPBK) in the INbus control field (IBCTL) of a sequencer instruction. Each byte that is transmitted to OUTbus 42 is captured in OUTbus pipe 48. This is normally a two-deep pipeline that constantly holds the last two values transmitted in a FIFO arrangement. In the preferred embodiment, OUTbus pipe 48 contains three 8-bit registers (as denoted by (8) in the drawings): OUTBUF register (0), 216, OUTBUF register (1), 214, and OUTBUF register (2), 218). Due to the nature of the CSC-PN array pipeline, a third buffer is required, and the operation of this pipe changes when the CSC is not RUNning and is asserting PAUSE. As depicted in the first row of FIG. 11, block 212, data is transferred into OUTBUF register (1), 214, from OUTbus 42. On the next cycle of a RUN operation, the data is transferred to OUTBUF register (0), 216, and then transferred to INbus 40 on the third clock. Under these conditions, OUTBUF register (2), 218, is not used.

When PAUSE is asserted by the CSC, the operation of OUTbus pipe 48 changes, as is depicted in the second row of FIG. 11, block 220. Under these circumstances, the values in OUTBUF register (1) 214 and OUTBUF register (0) 216 remain unchanged, while the data coming from OUTbus 42 is latched by OUTBUF register (2) 218. The remaining SPIN or PAUSE cycles are depicted in the third row, block 222, which depicts the three OUTBUF registers holding their values unchanged.

The fourth row, block 224, depicts the operation of OUTbus PIPE 48 for the first RUN cycle after PAUSE has become inactive. This is similar to the operation in block 212, except that OUTBUF register (1) 214 accepts data from OUTBUF register (2) 218, instead of directly from OUTbus 42.

Synchronization

Referring now to FIGS. 2, 3 and 8, the synchronization feature of the apparatus will be described. Synchronization, as used herein, means the ordering of data, by CSC 14, which comprises means for synchronizing, from a substantially asynchronous outside environment into a synchronous arrangement of data which may be efficiently acted upon by PN array 16. The outside, asynchronous data may enter the apparatus by way of CP 12, from direct I/O, or from external I/O.

CSC 14 is always trying to get the next segment of data which will be needed by PN array 16. This data may come from CP 12 by way of buffers 44 associated with STDin or ALTin, or by way of buffers associated with DIRin (46) or EXTin (30). Simultaneously, CSC 14 may have data therein which needs to be transferred to CP 12 by way of OUTPUT buffers 50 associated with STDout or ALTout, or by way of buffers associated with DIRout (52) or EXTout (30), which is stored under the direction of Master Control.

CSC 14 attempts to queue the next-needed data in the proper buffer so that the data will be available when needed by PN array 16 and may be transmitted thereto in a synchronized manner. To accomplish such synchronization, CSC 14 will SPIN if it cannot retrieve or dispose of needed data. CSC 14 requests access to INbus 40 or OUTbus 42 until access is allowed and the data can be disposed of. The programming techniques required for such actions, given the architecture disclosed herein, is believed to be well known to those skilled in the art.

Industrial Application

The sequencer and interface apparatus of the invention is operable to enhance control or host processors to provide additional capability for highly parallel operations, such as those found in neural networks or with SIMD operations. Specific applications are in voice and character recognition operations, in image compression and processing, expert systems, and robotic control systems.

What we claim is:

1. A computational system (10) for use with a host processor (12) having a memory unit (12a) therein, comprising:

at least one single-instruction multiple-data (SIMD) computational circuit component (16) having a first timing characteristic for processing inputs from an external device and for producing outputs thereto, wherein such inputs and outputs have a second timing characteristic that is different from said first timing characteristic;

at least one controller component (14) including transfer means (22) for effecting control instructions and bi-directional parallel data communications between said computational circuit component (16) and such external device.

2. The computational system of claim 1 which includes first multiplexing means (28) for selectively routing a data stream which is generated outside of the computational system (10) directly to said SIMD computational circuit component (16).

3. The computational system of claim 2 which includes second multiplexing means (26) for directly routing a data stream to/from said controller component (14) from a data generating/using device.

4. The computational system of claim 3 which includes direct input means (300) for directly routing a data stream from a data-generating device (304) to said controller component (14).

5. The computational system of claim 4 which includes a direct output means (302) for directly routing a data stream from said controller component (14) to a data-using device (330, 332).

6. The computational system of claim 3 wherein said data generating/using device is another controller component (72).

7. The computational system of claim 2 wherein said first multiplexing means includes means (74d, 76d, . . . ) for routing a data stream from said computational circuit component (16) directly to a data-using device.

8. The computational system of claim 1 wherein said controller component (14) includes and arithmetic logic unit (54) and wherein address locations for instructions and data which are acted upon by said SIMD computational circuit component (16) are generated by said arithmetic logic unit (54), which is operable to generate address locations in the host processor memory unit (12a).

9. The computational system of claim 8 wherein said arithmetic logic unit (54) includes means for sequentially addressing portions of data in a data stream in the host processor memory unit (12a).

10. The computational system of claim 9 which includes I/O buffers (44, 50) and wherein said means for sequentially addressing includes pointer means for setting pointers in said I/O buffers (44, 50), including addresses generated by said arithmetic logic unit (54), said pointer means being operable to define a window (210) delimiting a portion of data in a data stream in the host processor memory unit (12a).

11. The computational system of claim 1 wherein said SIMD computational circuit component (16) includes plural processor nodes (74, 76, . . . 84) for acting upon a data stream and wherein said controller component (14) includes a processor node instruction cache (58) which contains program instructions for said processor nodes (74, 76, . . . 84).

12. The computational system of claim 11 wherein said controller component (14) includes an instruction sequencer (22) for generating cache addresses and which includes means (92) for looping instructions repeatedly through said SIMD computational circuit component (16).

13. The computational system of claim 1 wherein said controller component includes a controller memory segment (128) therein and means (59) for selectively operating said controller memory segment (128) as a RAM storage unit or as a memory cache for said pointer means for addressing memory locations in the host processor memory unit (12a).

14. (Amended) The computational system of claim 1 wherein said controller component (14) includes an output channel (42, 50), for receiving output data from said SIMD computational circuit component (16), and an input channel (40, 44), for sending input data to said computational circuit component (16), which are connected to said SIMD computational circuit component (16), and which further includes a data shunt path (48) in said controller component (14) for routing data from the output channel (42, 50) to the input channel (40, 44).

15. The computational system of claim 1 which includes bus structure means (18, 34, 40, 42) which direct all signals flowing between the host processor (12) and said SIMD computational circuit component (16) through said controller component (14).

16. The computational system of claim 1 which includes means for forming a virtual data channel between said SIMD computational circuit component (16) and the host processor (12).

17. The computational system of claim 1 wherein all state information contained in the controller component (14) is accessible by the host processor (12).

18. A computational system (10) for use with a host processor (12) having a memory unit (12a) therein, the host processor (12) and the memory unit (12a) providing a memory interface defined by a first timing protocol comprising:

at least one single-instruction multiple-data (SIMD) computational circuit component (16) for processing inputs from outside thereof, said computational circuit component (16) defined by a second timing protocol that is different from the first timing protocol of the memory interface;

at least one controller component (14) operatively connected with said computational circuit component (16) and with the memory interface, said controller component (14) including transfer means (22) for effecting control instructions and bi-directional parallel data communications between the memory interface and said SIMD computational circuit component (16) and for, synchronizing the events occurring in said computational circuit component (16) with events occurring in the memory interface.

19. The computational system of claim 18 which includes first multiplexing means (28) for selectively routing a data stream which is generated outside of the computational system (10) directly to said SIMD computational circuit component (16).

20. The computational system of claim 19 which includes second multiplexing means (26) for directly routing a data stream to/from said controller component (14) from a data generating/using device.

21. The computational system of claim 20 which includes direct input means (300) for directly routing a data stream from a data-generating device (304) to said controller component (14).

22. The computational system of claim 21 which includes a direct output means (302) for directly routing a data stream from said controller component (14) to a data-using device (330, 332).

23. The computational system of claim 20 wherein said data generating/using device is another controller component (72).

24. The computational system of claim 19 wherein said first multiplexing means includes means (74d, 76d, . . . ) for routing a data stream from said SIMD computational circuit component (16) directly to a data-using device.

25. The computational system of claim 18 wherein all signals flowing between the host processor (12) and said computational circuit component (16) transit said controller component (14).

26. The computational system of claims 25, 19 or 20 which includes means for synchronizing data prior to routing data to a SIMD computational circuit component (16).

27. The computational system of claim 18 wherein said controller component (14) includes and arithmetic logic unit (54) and wherein address locations for instructions and data which are acted upon by said computational component (16) are generated by said arithmetic logic unit (54), which is operable to generate address locations in the host processor memory unit (12a).

28. The computational system of claim 27 wherein said arithmetic logic unit (54) includes means for sequentially addressing portions of data in a data stream in the host processor memory unit (12a).

29. The computational system of claim 28 which includes I/O buffers (44, 50) and wherein said means for sequentially addressing includes pointer means for setting pointers in said I/O buffers (44, 50), including addresses generated by said arithmetic logic unit (54), and for defining a window (210) delimiting a portion of data in a data stream in the host processor memory unit (12a).

30. The computational system of claim 18 wherein said SIMD computational circuit component (16) includes plural processor nodes (74, 76, . . . 84) for acting upon a data stream and wherein said controller component (14) includes a processor node instruction cache (58) which contains program instructions for said processor nodes (74, 76, . . . 84).

31. The computational system of claim 30 wherein said controller component (14) includes an instruction sequencer (22) for generating cache addresses and which includes means (92) for looping instructions repeatedly through said SIMD computational circuit component (16).

32. The computational system of claim 18 wherein said controller component (14) includes an output channel (42, 50), for receiving output data from said computational circuit component (16), and an input channel (40, 44), for sending input data to said computational circuit component (16), which are connected to said computational circuit component (16), and which further includes a data shunt path (48) in said controller component (14) for routing data from said output channel (42, 50) to said input channel (40, 44).

33. The computational system of claim 18 wherein said controller component includes a controller memory segment (128) therein and means (59) for selectively operating said controller memory segment (128) as a RAM storage unit or as a memory cache for said pointer means for addressing memory locations in the host processor memory unit (12a).

34. The computational system of claim 18 which includes means for forming a virtual data channel between said SIMD computational circuit component (16) and the host processor (12).

35. The computational system of claim 18 wherein all state information contained in said controller component (14) is accessible by the host processor (12).

* * * * *